(12) United States Patent
Balourdet

(10) Patent No.: US 9,867,438 B2
(45) Date of Patent: Jan. 16, 2018

(54) EXPLOSION PROOF ASSEMBLY

(71) Applicants: XCIEL, INC., Katy, TX (US); Xavier Balourdet, Katy, TX (US)

(72) Inventor: Xavier Balourdet, Katy, TX (US)

(73) Assignee: XCIEL, INC., Katy, TX (US)

(*) Notice: Subject to any disclaimer, the term of this patent is extended or adjusted under 35 U.S.C. 154(b) by 0 days.

(21) Appl. No.: 14/431,676

(22) PCT Filed: Sep. 26, 2013

(86) PCT No.: PCT/US2013/062059
§ 371 (c)(1),
(2) Date: Mar. 26, 2015

(87) PCT Pub. No.: WO2014/052683
PCT Pub. Date: Apr. 3, 2014

(65) Prior Publication Data
US 2015/0265018 A1 Sep. 24, 2015

Related U.S. Application Data

(60) Provisional application No. 61/705,632, filed on Sep. 26, 2012.

(51) Int. Cl.
*H04M 1/00* (2006.01)
*A45C 11/00* (2006.01)
(Continued)

(52) U.S. Cl.
CPC ............ *A45C 11/00* (2013.01); *A45C 13/008* (2013.01); *H01R 13/52* (2013.01); *H04B 1/3888* (2013.01);
(Continued)

(58) Field of Classification Search
None
See application file for complete search history.

(56) References Cited

U.S. PATENT DOCUMENTS 4,664,281 A 5/1987 Falk et al.
4,847,602 A 7/1989 Altland et al.
(Continued)

FOREIGN PATENT DOCUMENTS

JP  H07168649 A  7/1995
JP  3088056 A  9/2000
(Continued)

OTHER PUBLICATIONS

Japanese Office Action dated Mar. 22, 2016, for Application No. 2015-534683, and English translation.
(Continued)

*Primary Examiner* — Lana N Le
(74) *Attorney, Agent, or Firm* — Rao DeBoer Osterrieder, PLLC; John M. DeBoer

(57) ABSTRACT

An explosion proof assembly includes a case configured to receive a waterproof assembly having a waterproof enclosure housing a computing device, wherein the case is configured to prevent combustion within an internal cavity of the waterproof enclosure. The assembly may include a flap coupled to the case to retain the computing device in the case, wherein the flap includes a tool-operated retention member configured to retain the flap in a closed position, wherein the retention member of the case is configured to be unfastened using a tool, and wherein the case and the tool-operated retention member are configured to prevent combustion within an internal cavity of the computing device.

16 Claims, 19 Drawing Sheets

(51) Int. Cl.
    *A45C 13/00*     (2006.01)
    *H04B 1/3888*    (2015.01)
    *H01R 13/52*     (2006.01)
    *H04M 1/02*      (2006.01)
    *H04B 1/38*      (2015.01)

(52) U.S. Cl.
    CPC ..... *H04M 1/0202* (2013.01); *A45C 2011/002* (2013.01); *A45C 2011/003* (2013.01); *A45C 2200/15* (2013.01); *H04B 2001/3894* (2013.01); *Y10T 29/49826* (2015.01)

(56) References Cited

U.S. PATENT DOCUMENTS

| | | | |
|---|---|---|---|
| 4,894,748 A | 1/1990 | Shefet | |
| 5,534,664 A | 7/1996 | Fearing, Jr. et al. | |
| 5,583,742 A * | 12/1996 | Noda | G06F 1/1626 248/632 |
| 5,838,589 A | 11/1998 | Nail et al. | |
| 5,844,772 A | 12/1998 | Lee et al. | |
| 6,574,652 B2 | 6/2003 | Burkhard | |
| 6,583,982 B2 | 6/2003 | Mancini et al. | |
| 6,795,319 B2 | 9/2004 | Preston et al. | |
| 7,086,283 B2 | 8/2006 | Koyano et al. | |
| 7,102,081 B2 | 9/2006 | Xu et al. | |
| 7,321,096 B1 | 1/2008 | Huang | |
| 7,436,653 B2 * | 10/2008 | Yang | H04M 1/0202 361/679.01 |
| 7,907,394 B2 * | 3/2011 | Richardson | G06F 1/1613 361/679.3 |
| 7,916,117 B2 | 3/2011 | Staiger | |
| 7,921,997 B2 * | 4/2011 | Burns | A45C 13/00 206/320 |
| 8,503,170 B1 | 8/2013 | Hsu et al. | |
| 8,875,879 B2 * | 11/2014 | Diebel | A45C 11/00 206/320 |
| 9,261,912 B2 * | 2/2016 | Bell | G06F 1/1637 |
| 9,615,476 B2 * | 4/2017 | Rayner | H05K 5/061 455/575.8 |
| 2003/0184958 A1 | 10/2003 | Kao | |
| 2004/0002269 A1 | 1/2004 | Jahn | |
| 2005/0011920 A1 * | 1/2005 | Feng | B60R 7/043 224/275 |
| 2006/0149430 A1 * | 7/2006 | Slaton | A45C 3/02 701/1 |
| 2007/0095554 A1 * | 5/2007 | Noda | H01H 9/042 174/55 |
| 2007/0221288 A1 | 9/2007 | Olesen et al. | |
| 2007/0280677 A1 * | 12/2007 | Drake | G02B 7/02 396/429 |
| 2007/0282208 A1 | 12/2007 | Jacobs et al. | |
| 2009/0059492 A1 | 3/2009 | Glover | |
| 2009/0272662 A1 | 11/2009 | Lin et al. | |
| 2010/0258331 A1 | 10/2010 | Dahlgren et al. | |
| 2011/0051348 A1 | 3/2011 | Song | |
| 2011/0090846 A1 * | 4/2011 | Hao | G06Q 10/087 370/328 |
| 2012/0033396 A1 | 2/2012 | Goedknegt et al. | |
| 2012/0057295 A1 | 3/2012 | Simpson et al. | |
| 2012/0314354 A1 * | 12/2012 | Rayner | G06F 1/1656 361/679.01 |
| 2013/0120258 A1 * | 5/2013 | Maus | G06F 3/044 345/161 |
| 2014/0226062 A1 * | 8/2014 | Parrill | H04N 5/2252 348/376 |
| 2015/0194995 A1 * | 7/2015 | Fathollahi | H04B 1/3888 455/575.8 |

FOREIGN PATENT DOCUMENTS

| | | | |
|---|---|---|---|
| JP | 2007100719 A | | 4/2007 |
| JP | 2007133762 A | | 5/2007 |
| JP | 2008061054 A | | 3/2008 |
| JP | 2010015017 | * | 1/2010 |
| JP | 2010015017 A | * | 1/2010 |
| JP | 2012017987 A | | 1/2012 |
| JP | 3177946 U | | 8/2012 |
| JP | 2012-182200 A | | 9/2012 |

OTHER PUBLICATIONS

Vector InfoTech, Rugged Computers/Tablet PC—Hazardous Area, iX104C5 DMSR-M, 2011, www.vectorinfotech.com.
Triton D1-D, Crane Azonix, 2007, www.azonix.com/PDFs/Triton-D1-D.pdf.
Ruffneck Zone 1, Computer Dynamics—GE Fanuc Company, 2007, www.cdynamics.com.
International Search Report and Written Opinion dated Jun. 2, 2013, for International Application No. PCT/US2013/023900.
USPTO Office Action dated Feb. 26, 2014 for U.S. Appl. No. 13/683,834.
Response to Office Action dated Feb. 26, 2014 for U.S. Appl. No. 13/683,834.
USPTO Final Office Action dated Jul. 18, 2014 for U.S. Appl. No. 13/683,834.
Response to Final Office Action dated Jul. 18, 2014 for U.S. Appl. No. 13/683,834.
USPTO Office Action dated Nov. 28, 2014 for U.S. Appl. No. 13/683,834.
Response to Office Action dated Nov. 28, 2014 for U.S. Appl. No. 13/683,834.
PCT International Search Report dated Jan. 7, 2014, for International Application No. PCT/US2013/062059, filed Sep. 26, 2013.

* cited by examiner

EXPLOSION PROOF ASSEMBLY

CROSS-REFERENCE TO RELATED APPLICATION

This application is a 35 U.S.C. §371 national stage application of PCT/US2013/062059 filed Sep. 26, 2013 and entitled "Explosion Proof Assembly," which claims the benefit of U.S. provisional patent application Ser. No. 61/705,632 filed Sep. 26, 2012 and entitled "Non-incentive, non-modified iPhone5 with custom enclosure which allow the user to operate this Apple phone in a Class1 Div2, ATEX Zone2 and IECEx classified area, Hazardous Location Listing for the US, Canada, Europe and the rest of the world," both of which are incorporated by reference herein in their entirety.

STATEMENT REGARDING FEDERALLY SPONSORED RESEARCH OR DEVELOPMENT

Not applicable.

BACKGROUND

The use of electrical devices in hazardous areas may lead to an increased risk of a fire or explosion triggered by the presence of the electrical device. For instance, an electrical device may serve as an ignition source in a hazardous area containing flammable fluids or vapors. For this reason, electrical devices used in hazardous areas are often required to be certified according to the requirements specified in that particular jurisdiction. Further, often the types of protections required vary depending on the risks and hazards involved.

The types of hazardous environments are broken down into three classes, with each class focusing on different types of hazardous materials in the surrounding atmosphere. For instance: Class I areas include flammable gasses or vapors present in the air in sufficient quantities to produce an explosion in the presence of an ignition source; Class II areas include the presence of combustible dusts; and Class III areas include ignitable fibers or other materials too heavy to be suspended in the air in sufficient quantities to produce an ignitable mixture (e.g., wood chips, cotton, nylon, etc.). These hazardous area environments are further explained in the ANSI/ISA-12.12.01 standards. Two common types of hazardous areas requiring protection for electrical devices are areas that contain flammable vapors and areas containing dust or other particulates susceptible to ignition. Further, each class is divided into two divisions based on the probability of hazardous materials being present in an ignitable or combustible concentration in the surrounding air. Division 1 defines hazardous environments where the pertinent hazardous material (e.g., vapors, dust, fibers) is present during normal conditions. Division 2 defines hazardous environments where the pertinent hazardous material is present only in abnormal or fault conditions (e.g., in the event of a container failure or other leak).

Regarding Class I hazardous environments involving flammable vapors, an electrical device may be used in such an area via an explosion proof enclosure or assembly configured to keep an internal explosion within the explosion proof assembly from escaping outward, where it would ignite vapors outside of the enclosure. Thus, with regard to environments having flammable vapors, explosion proof assemblies are designed to both prevent the entry of flammable materials into the enclosure and also, in the event of an explosion within the enclosure, to prevent the escape of hot or burning material from escaping the enclosure. Regarding Class II hazardous environments involving ignitable dusts and particulates, an electrical device may be used in such an area via a dust-ignition proof enclosure or assembly that is configured to prevent ignitable materials from entering the enclosure and by containing any arcs, sparks or heat within the enclosure that may ignite dust or other particulates in the surrounding environment. Also, there exists assemblies and enclosures for use with an electrical device that are referred to as "intrinsically safe," where an intrinsically safe assembly including an electrical device is incapable of releasing sufficient electrical or thermal energy to cause ignition of a specific hazardous substance Class I, Class II and Class III substances) under normal or abnormal conditions. Further, "nonincendive" components are nonsparking and incapable of releasing sufficient electrical/thermal energy to cause ignitions to hazardous substances during normal (i.e., Division 1) operating conditions.

While assemblies or enclosures have been developed for use in hazardous areas, these components are often expensive and not configured for use with particular electrical devices. Also, these components may only satisfy the requirements for a particular class and division, and thus may not be used in other hazardous environments or in hazardous environments under abnormal conditions (i.e., Division 2 conditions). Further, these components may be cumbersome and restrict the functionality of the electrical device being protected. For instance, these components may be permanently coupled to the protected electrical device, restricting the use of multiple electrical devices with the same enclosure. Thus, there is a need in the art for an intrinsically safe or explosion proof assembly and/or enclosure capable of being safely used in varying types of conditions hazardous environments. Also, it would be beneficial if such an enclosure was not permanently coupled to or formed integrally with the protected electrical device, allowing the use of different electrical devices with the same enclosure. Moreover, it would be beneficial if such an enclosure was quickly and conveniently separable from the protected electrical device.

BRIEF SUMMARY OF THE DISCLOSURE

In some embodiments, an explosion proof assembly includes a case configured to receive a waterproof assembly having a waterproof enclosure housing a computing device, wherein the case is configured to prevent combustion within an internal cavity of the waterproof enclosure. The computing may have an electrical connector, and the computing device may be disposed in the waterproof enclosure, wherein the waterproof enclosure is configured to restrict the ingress of water and dust into the waterproof enclosure. In some embodiments, the case includes a flap having a tool-operated retention mechanism configured to secure the flap in a closed position. In some embodiments, when the flap is in a closed position, the electrical connector of the computing device is prevented from being exposed to the surrounding environment.

In some embodiments, an explosion proof assembly includes a case, a computing device received in the case, a flap coupled to the case to retain the computing device in the case, wherein the flap comprises a tool-operated retention member configured to retain the flap in a closed position, and wherein the retention member of the case is configured to be unfastened using a tool, and wherein the case and the tool-operated retention member are configured to prevent combustion within an internal cavity of the computing device. The assembly may include a waterproof enclosure having a flexible body and a cavity, wherein the computing device is disposed in the cavity of the waterproof enclosure. The computing device may include an electrical connector. In some embodiments, when the flap of the case is in the closed position, the electrical connector of the computing device is isolated from the surrounding environment.

In some embodiments, a method of forming an explosion proof assembly includes disposing a computing device in a waterproof enclosure, disposing the computing device and waterproof enclosure in an outer case, and fastening a retention mechanism of the outer case to retain the computing device and waterproof enclosure in the outer case and form the explosion proof assembly in an assembled configuration, wherein, when in the assembled configuration, the explosion proof enclosure is configured to prevent combustion within an internal cavity of the waterproof enclosure from escaping into the surrounding environment.

Embodiments described herein comprise a combination of features and characteristics intended to address various shortcomings associated with certain prior devices, systems, and methods. The various features and characteristics described above, as well as others, will be readily apparent to those skilled in the art upon reading the following detailed description, and by referring to the accompanying drawings.

BRIEF DESCRIPTION OF THE DRAWINGS

For a detailed description of exemplary embodiments, reference will now be made to the accompanying drawings in which.

DETAILED DESCRIPTION

Figure 1:
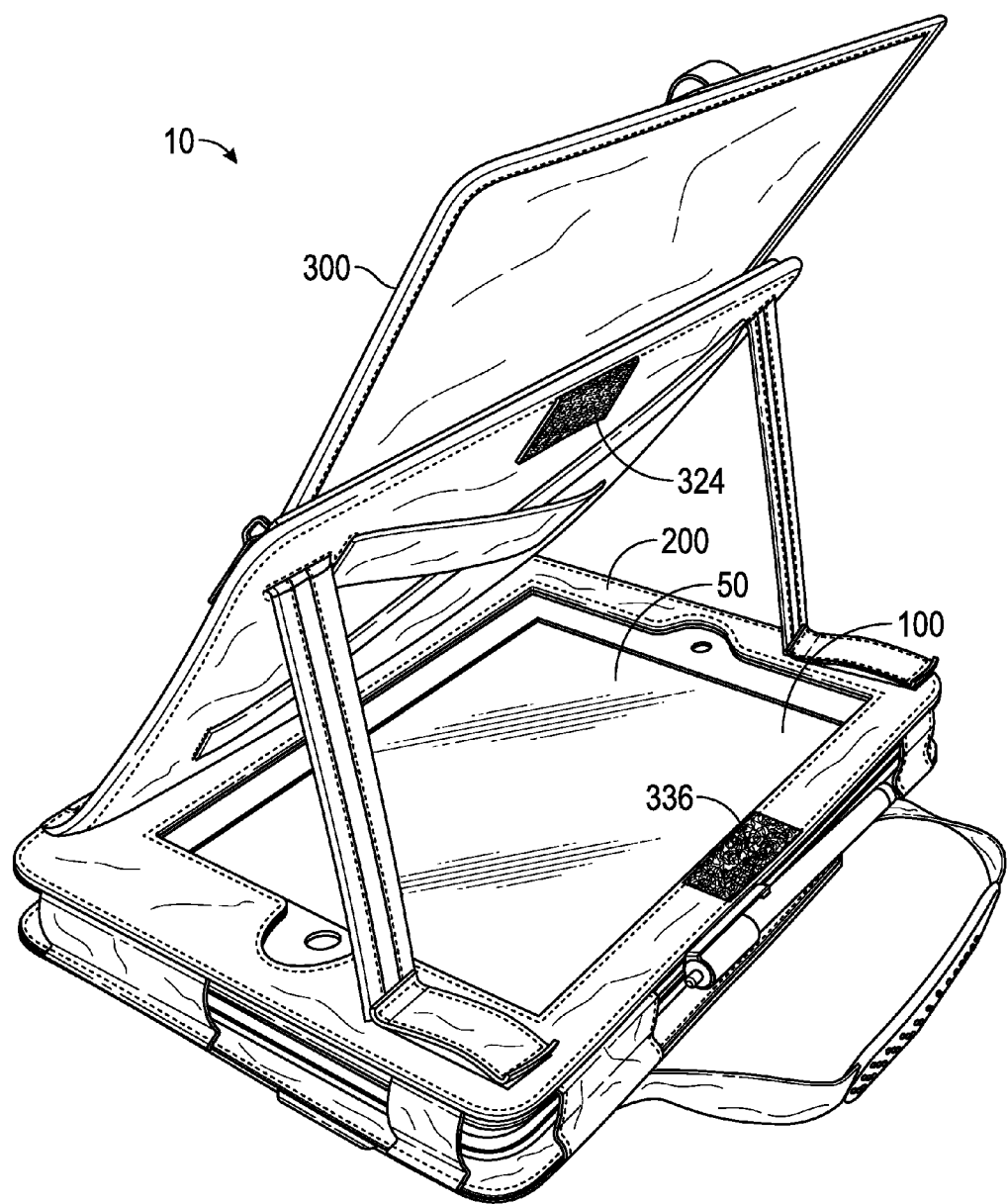
FIG. 1 is front view of an embodiment of an explosion proof assembly in accordance with principles disclosed herein.

In the drawings and description that follow, like parts are typically marked throughout specification and drawings with the same reference numerals. The drawing figures are not necessarily to scale. Certain features of the invention may be shown exaggerated in scale or in somewhat schematic form and some details of conventional elements may not be shown in the interest of clarity and conciseness. The present disclosure is susceptible to embodiments of different forms. Specific embodiments are described in detail and are shown in the drawings, with the understanding that the present disclosure is to be considered an exemplification of the principles of the disclosure, and is not intended to limit the disclosure to that illustrated and described herein, it is to be fully recognized that the different teachings of the embodiments discussed below may be employed separately or in any suitable combination to produce desired results.

Unless otherwise specified, in the following discussion and in the claims, the terms "including" and "comprising" are used in an open-ended fashion, and thus should be interpreted to mean "including, but not limited to . . . .". Any use of any form of the terms "connect", "engage", "couple", "attach", or any other term describing an interaction between elements is not meant to limit the interaction to direct interaction between the elements and may also include indirect interaction between the elements described. The term "fluid" may refer to a liquid or gas and is not solely related to any particular type of fluid such as hydrocarbons. The terms "pipe", "conduit", "line" or the like refers to any fluid transmission means. The terms "left," "right," "upper" and "lower" may be used for the convenience of distinguishing between varying features of an embodiment and may not necessarily indicate relative directions of each feature relative one another. The various characteristics mentioned above, as well as other features and characteristics described in more detail below, will be readily apparent, to those skilled in the art upon reading the following detailed description of the embodiments, and by referring to the accompanying drawings.

The embodiments described herein include an explosion proof assembly that includes a tablet computer having a touch screen, such as the iPad® and iPad mini® produced by Apple, Inc. Other embodiments described herein comprise a explosion proof assembly that includes smartphone having a touch screen, such as the iPhone® produced by Apple. Inc. In some embodiments, the explosion proof assembly includes a tablet assembly generally comprising a tablet computer disposed within an enclosure configured to restrict fluid and dust from entering or exiting the enclosure (i.e., a waterproof enclosure). In some embodiments, an explosion proof assembly is formed by disposing the waterproof tablet assembly within an outer case. In other embodiments, an explosion proof assembly is formed by disposing a waterproof smartphone tablet assembly within an outer case, where the waterproof smartphone tablet assembly generally comprises a smartphone disposed within a waterproof enclosure.

The outer case for each embodiment allows for the use of the waterproof tablet and smartphone assemblies in hazardous areas including flammable vapors and ignitable dust, corresponding to Class I and Class II areas, respectively. Also, the outer enclosure allows for the use of the waterproof tablet assembly in hazardous areas during Division 2 conditions. Further, the explosion proof assemblies discussed herein are configured to be nonincendive such that the assemblies do not allow for the release of any sparks or electrical/thermal energy sufficient to cause ignition of hazardous substances in the surrounding environment.

In an embodiment, a non-incentive, non-modified tablet computer (e.g., iPad 2, iPad 3, iPad mini etc.) with an accompanying outer case is provided that allows a user to operate the tablet in hazardous environments, including Class I/Division 2, Class II/Division 2, ATEX Zone 2 and IFCEx classified areas.

Referring initially to FIG. 1, an explosion proof assembly 10 that generally includes a waterproof assembly 50 disposed within an outer case 300, where the waterproof assembly 50 generally includes a computing device or tablet computer 100 and a waterproof enclosure 200. In this embodiment, tablet 100 is an iPad® produced by Apple, Inc. However, in other embodiments tablet 100 may comprise other varying types and styles of tablet computers, including but not limited to those from Apple and other manufacturers. In other embodiments, the computing device 100 may be a smart phone.

Figure 2:
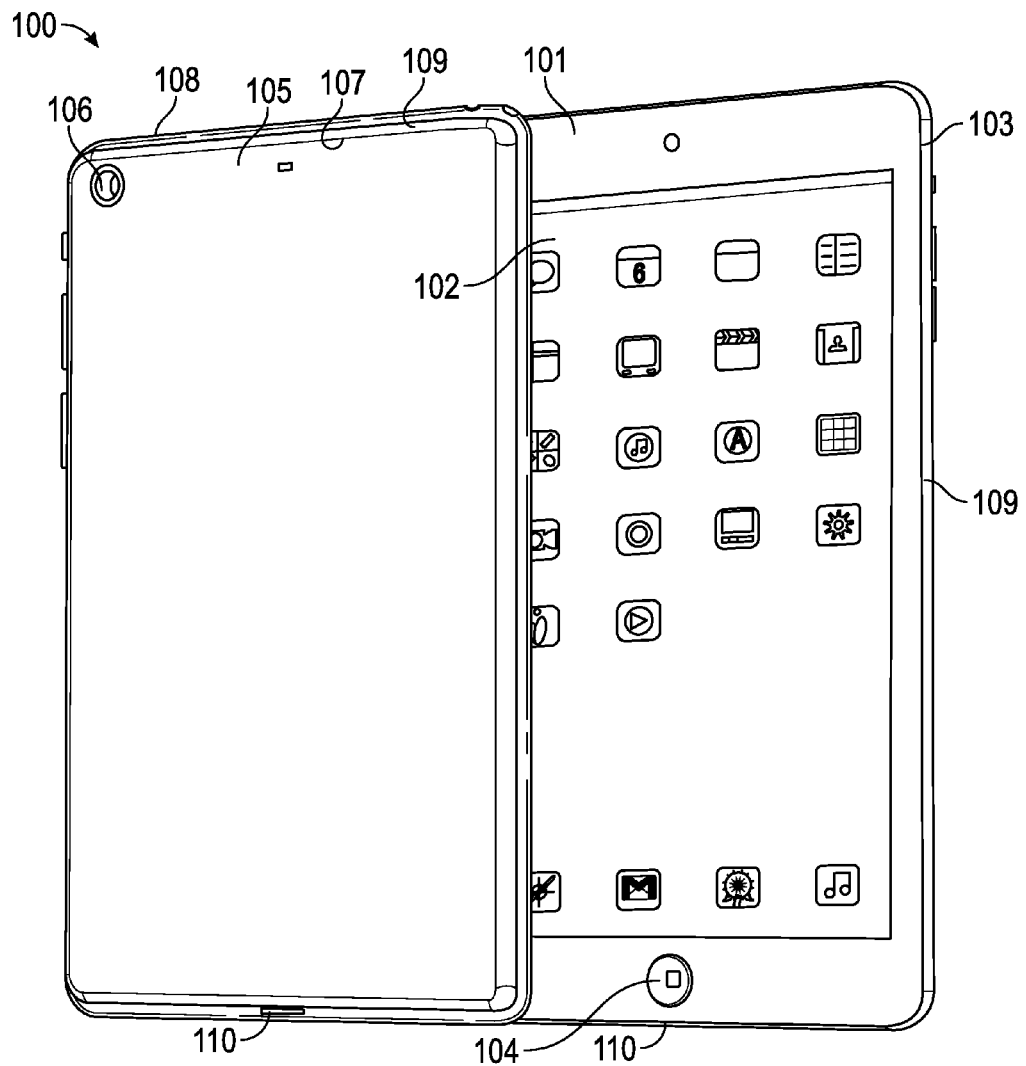
FIG. 2 includes front and rear views of a tablet computer in accordance with principles disclosed herein.

Referring to FIG. 2, in this embodiment tablet 100 of waterproof assembly 50 is an iPad® 4 produced by Apple, Inc. However, in other embodiments tablet 100 may comprise other varying types and styles of tablet computers, including but not limited to those from Apple and other manufacturers. Tablet 100 has a flat front face 101 defined by a front outer edge 103, which includes a touch screen 102. Tablet 100 also includes a flat rear face 105 that is defined by a rear outer edge 107. Extending between front outer edge 103 and rear outer edge 107 is a chamfered surface 109. Tablet 100 also includes a first button 104 (home button) disposed on front face 101, a camera lens 106 disposed on rear face 105 and a second button 108 (on/off button) disposed on chamfered edge 109. An input connector 110 is disposed on chamfered surface 109. Input connector 110 is configured to allow for data and/or electrical power transfer between tablet 100 and an external electrical device.

Figure 3:
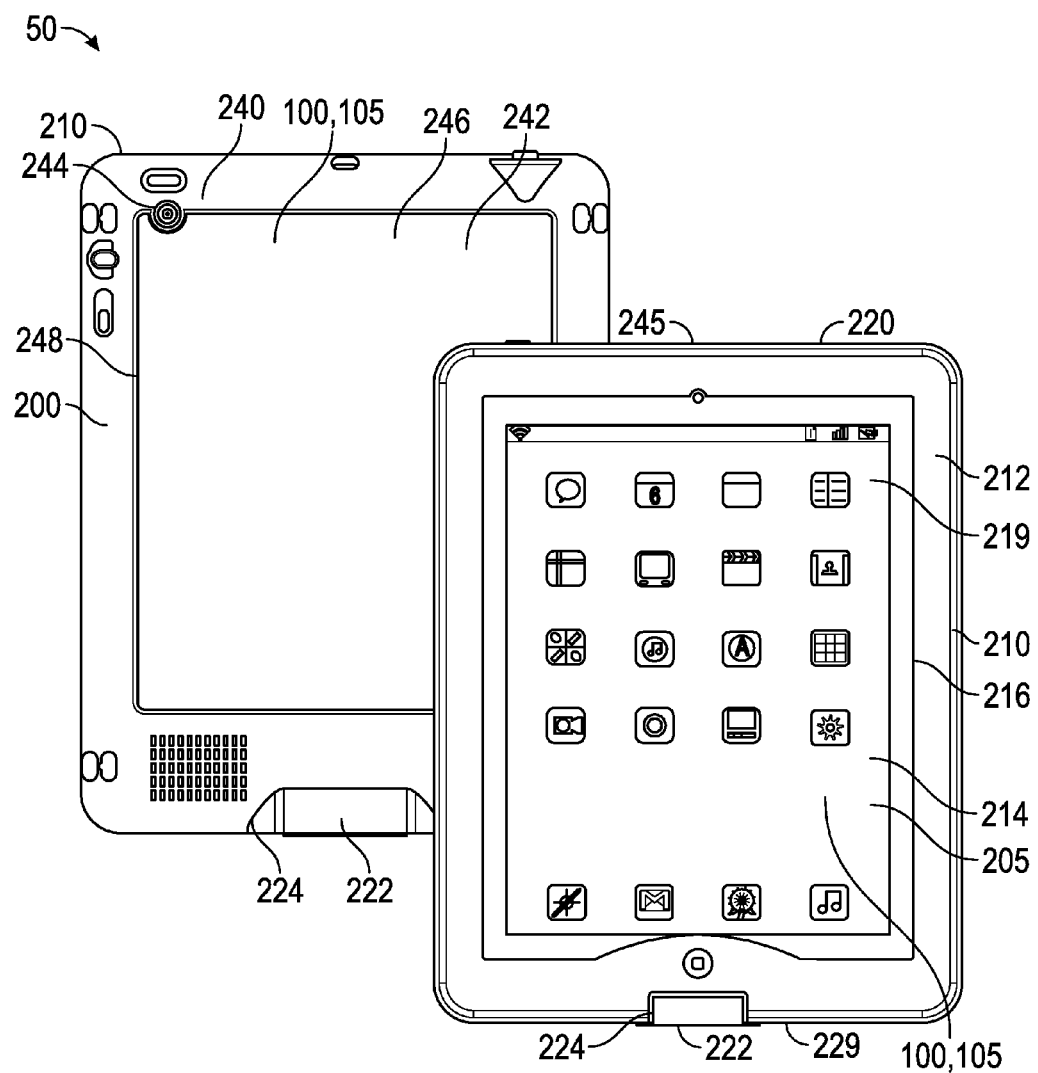
FIG. 3 includes front and rear views of a waterproof tablet assembly in accordance with principles disclosed herein.
Figure 4:
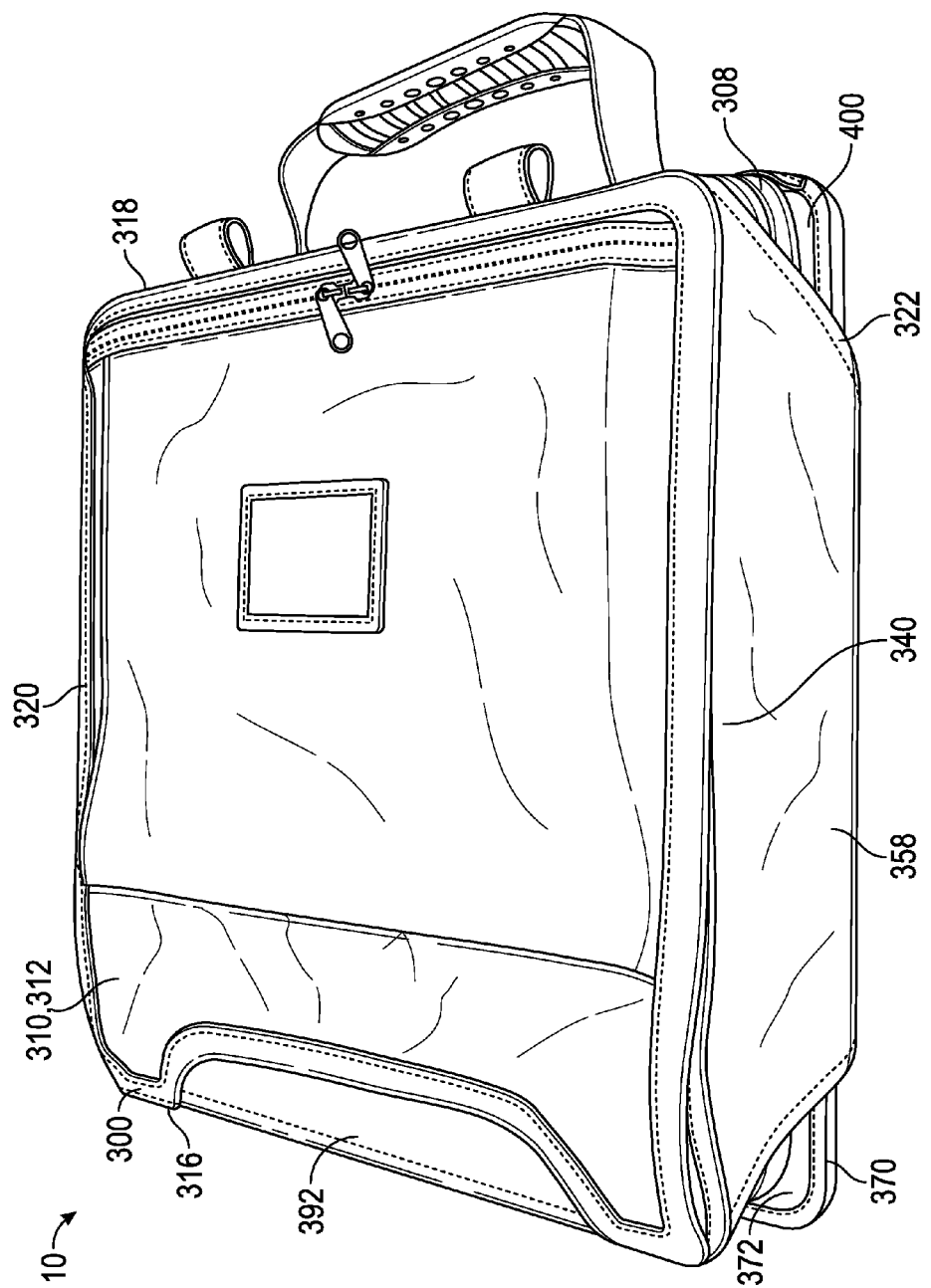
FIGS. 4-15 are perspective front views of the explosion proof assembly of FIG. 1.
Figure 5:
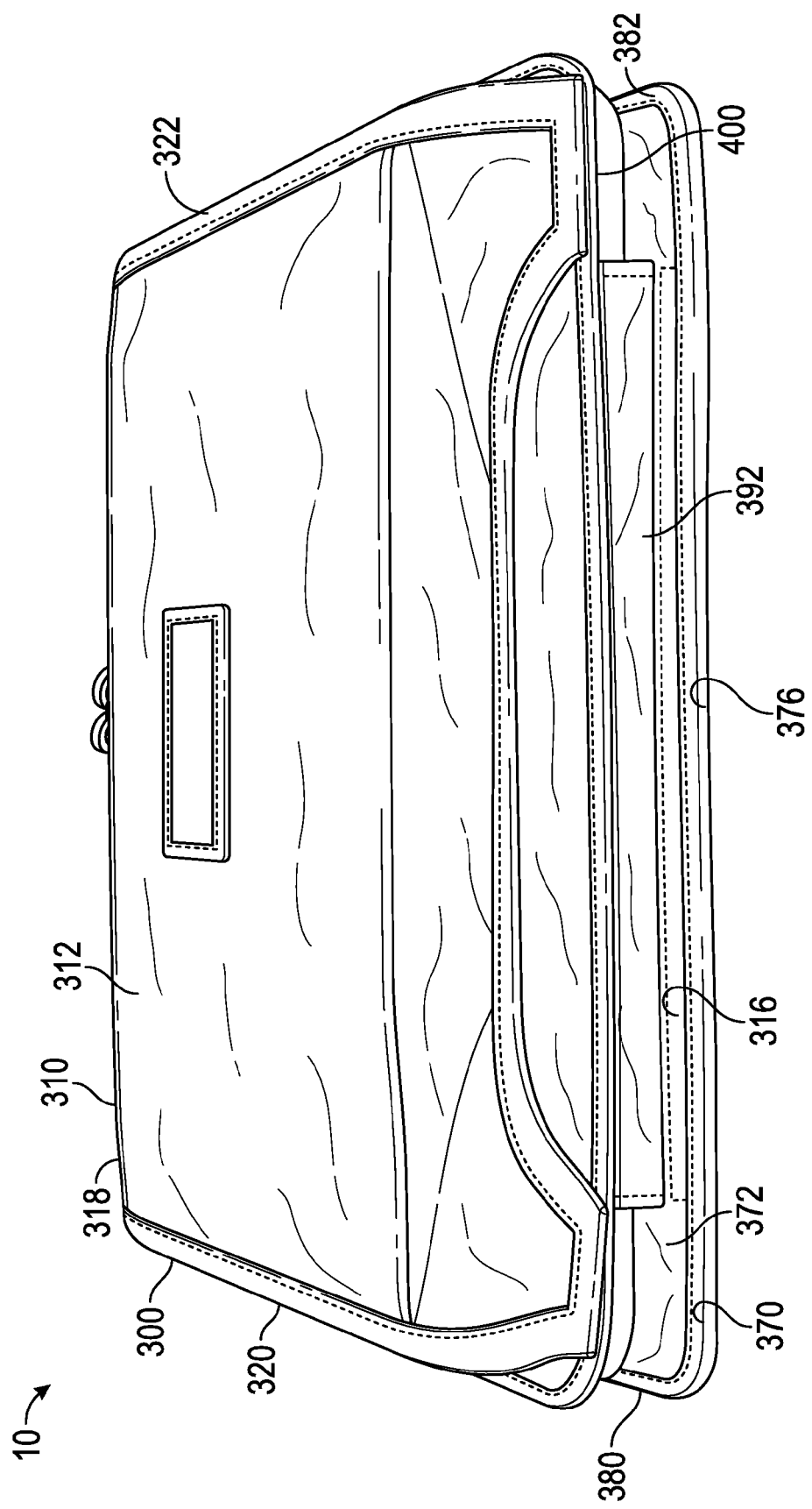
Figure 6:
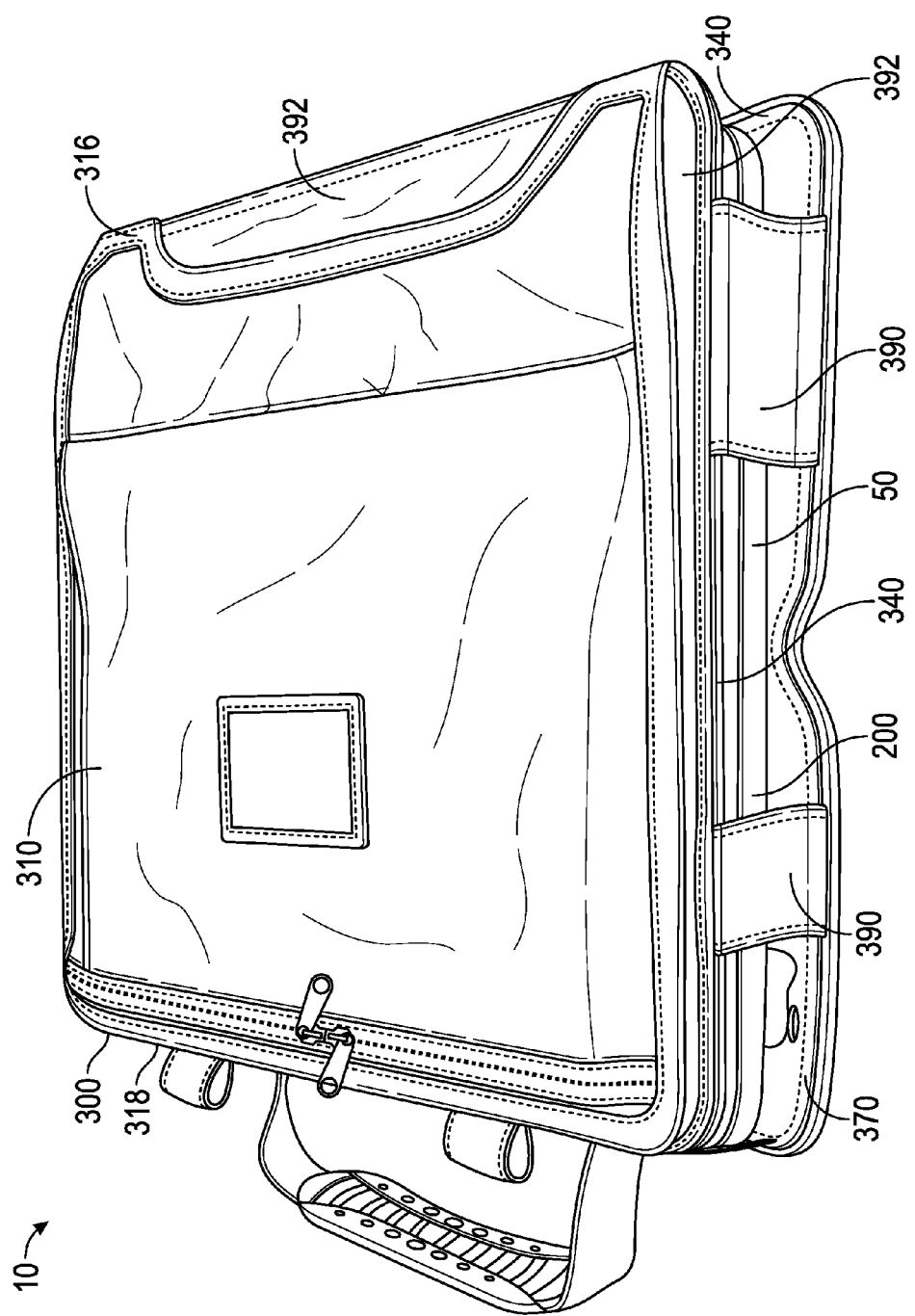
Figure 7:
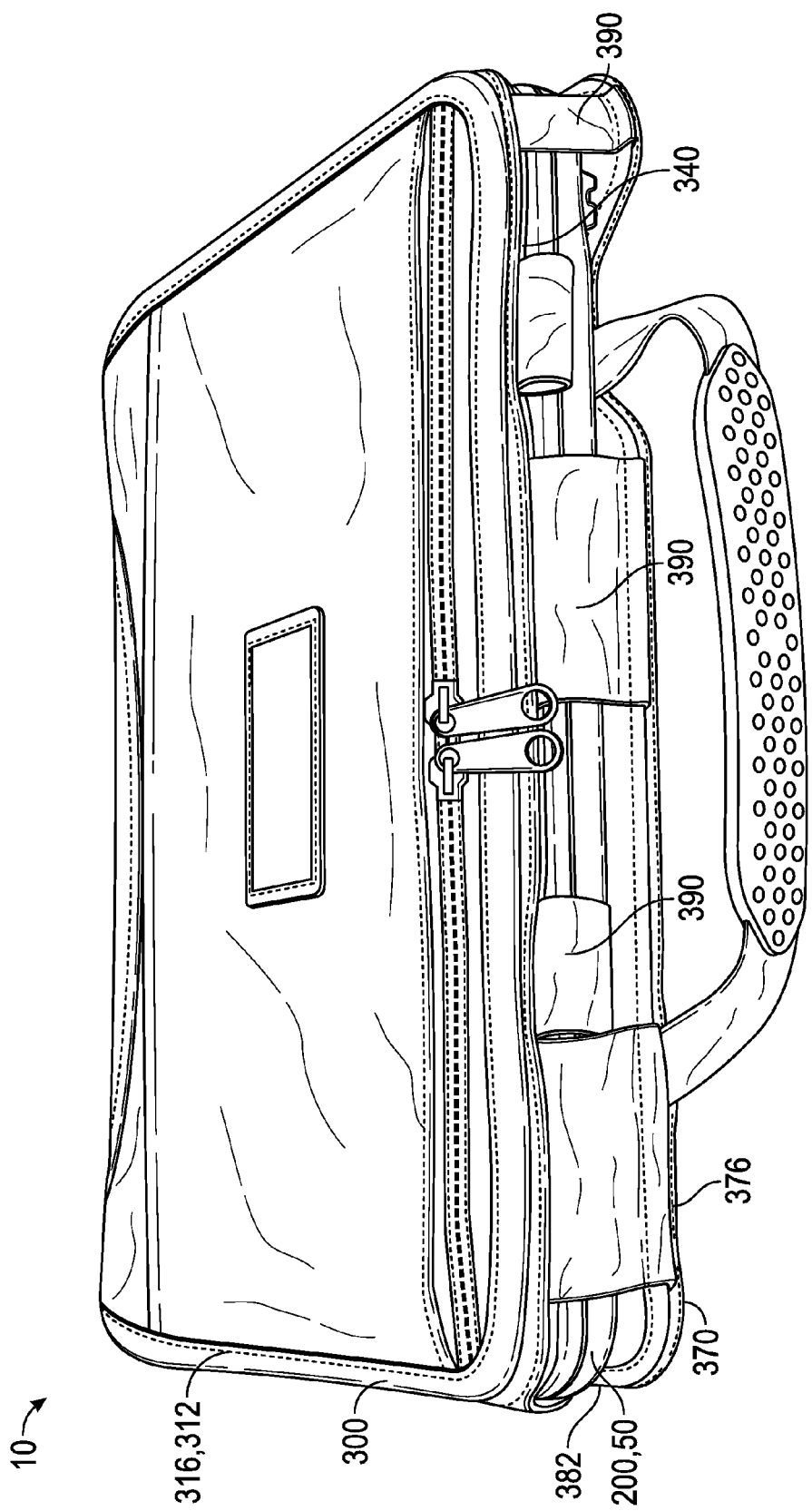
Figure 8:
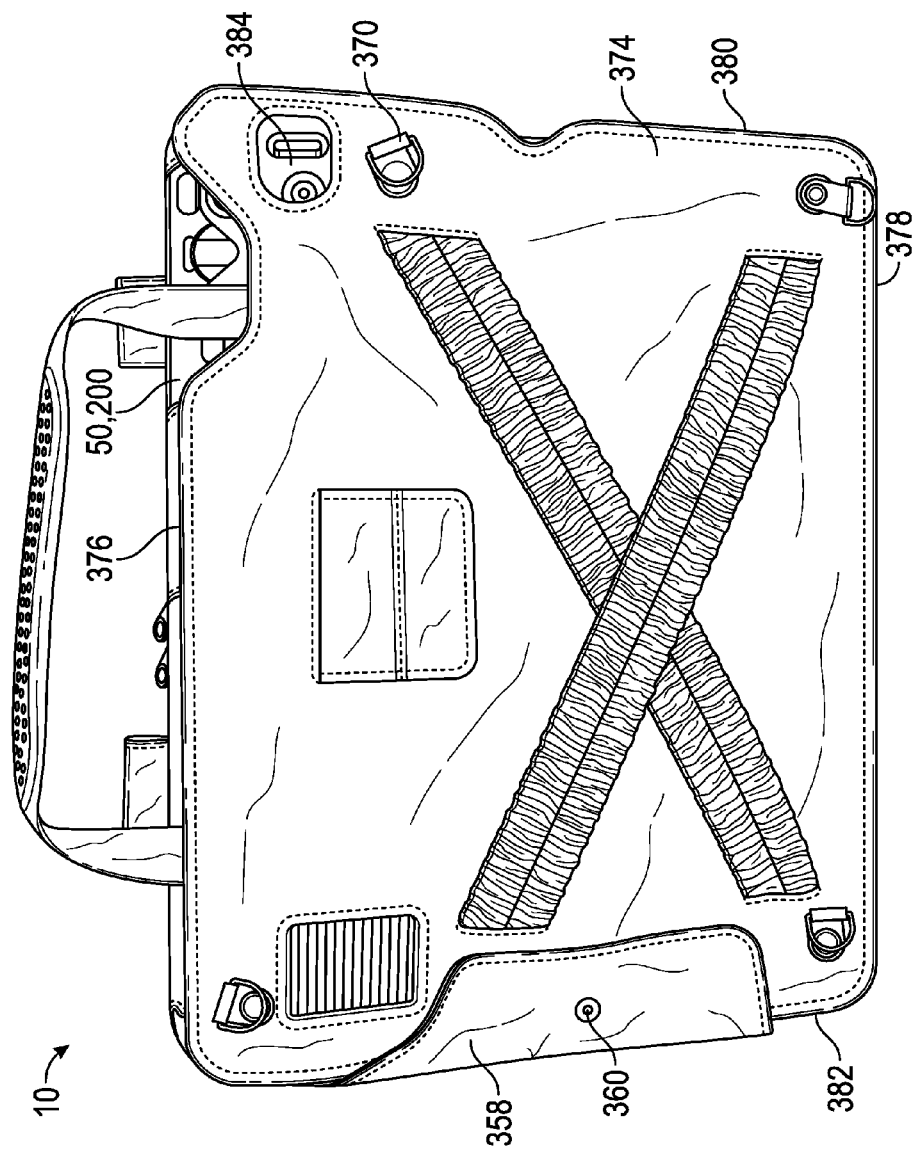
Figure 9:
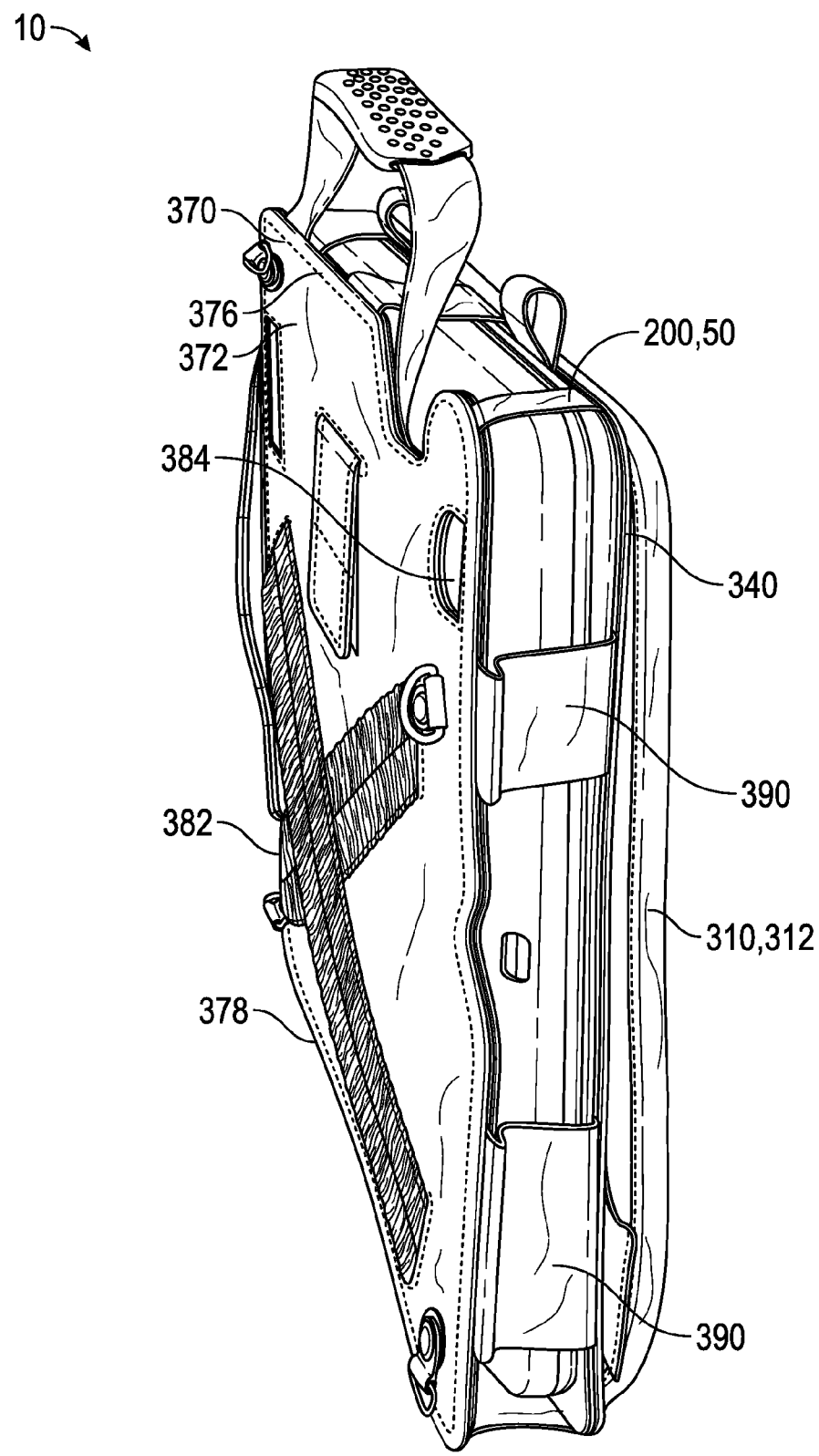

Referring to FIG. 3, enclosure 200 of waterproof assembly 50 (shown in an assembled configuration) is configured to prevent or at least substantially restrict fluids or particles (e.g., dust, particulates, fibers, etc.) from entering or exiting assembly 50. In this embodiment, enclosure 200 generally includes a body 210 formed from a flexible material (e.g., a firm rubber, polycarbonate or polyurethane material) having a front face 212 including a front central opening 214 extending therethrough, outer edge 220, a second or rear face 240 including a rear central opening 242 extending therethrough and an inner cavity 205 for housing the tablet 100. In this embodiment, enclosure 200 satisfies the IP-68 ingress protection rating standard with respect to dust and water. However, in other embodiments enclosure 200 may be formed from other materials and may be configured to satisfy other ingress protection ratings.

Front face 212 of enclosure 200 also includes a front lip 216 for sealing between body 210 of enclosure 200 and front face 101 of tablet 100, providing for convenient actuation of touch screen 102 while restricting ingress and egress of dust and water across the seal formed between lip 216 and face 101. Further, due to the flexibility of body 210, first button 104 may be depressed, and thus, actuated by applying pressure (i.e., pressing down upon) to the portion of front face 210 disposed over the button 104 of tablet 100 of waterproof assembly 50.

Still referring to FIG. 3, rear face 240 also includes a lens 244 disposed over camera lens 106 of tablet 100 and a transparent screen 246 disposed in rear opening 242. Screen 246 is attached to body 210 at an inner lip 248 of rear face 240, thus restricting the ingress or egress of dust or water between screen 246 and body 210 of enclosure 200. Along edge 220 of body 210 that extends between front face 212 and rear face 240 is disposed a charging port 222, which allows for access to the input connector 110 of tablet 100. Port 222, when in the closed position as shown in FIG. 3, maintains a seal 224 with the rest of the body 212 of enclosure 200. Therefore, when port 222 is in the closed position, the ingress or egress of dust or water is restricted into or out of the enclosure 200. However, as will be further detailed below, charging port 222 does not include a mechanism for retaining port 222 in the closed position. Also, as with first button 104, the flexibility of body 212 allows for the actuation of second button of tablet 100 via depressing the portion of body 212 along edge 240 that is disposed over second button 108 when waterproof assembly 50 is in the assembled configuration.

Now referring to FIGS. 4-16, the outer case 300 is configured provide additional protection to tablet 100 of waterproof assembly 50, such that, when assembly 50 is installed in case 300 to form explosion proof assembly 10 (as shown in FIG. 1), combustion resulting from the exposure of tablet 100 is prevented or at least minimized. For instance, in this embodiment explosion proof assembly 10 is configured to satisfy the certification requirements of Class I, Division II, Class II, Division 2, class III, Divisions 1 and 2, and ATEX Zone 2 hazardous area classifications. However, in other embodiments an explosion proof assembly 10 may satisfy the safety requirements for hazardous area classifications. For instance, in other embodiments explosion proof assembly 10 may satisfy IECEx certification requirements. Further, explosion proof assembly 10 is configured to allow for the safe operation of tablet 100 in the aforementioned hazardous area classifications while still satisfying the certification requirements for those areas.

Figure 14:
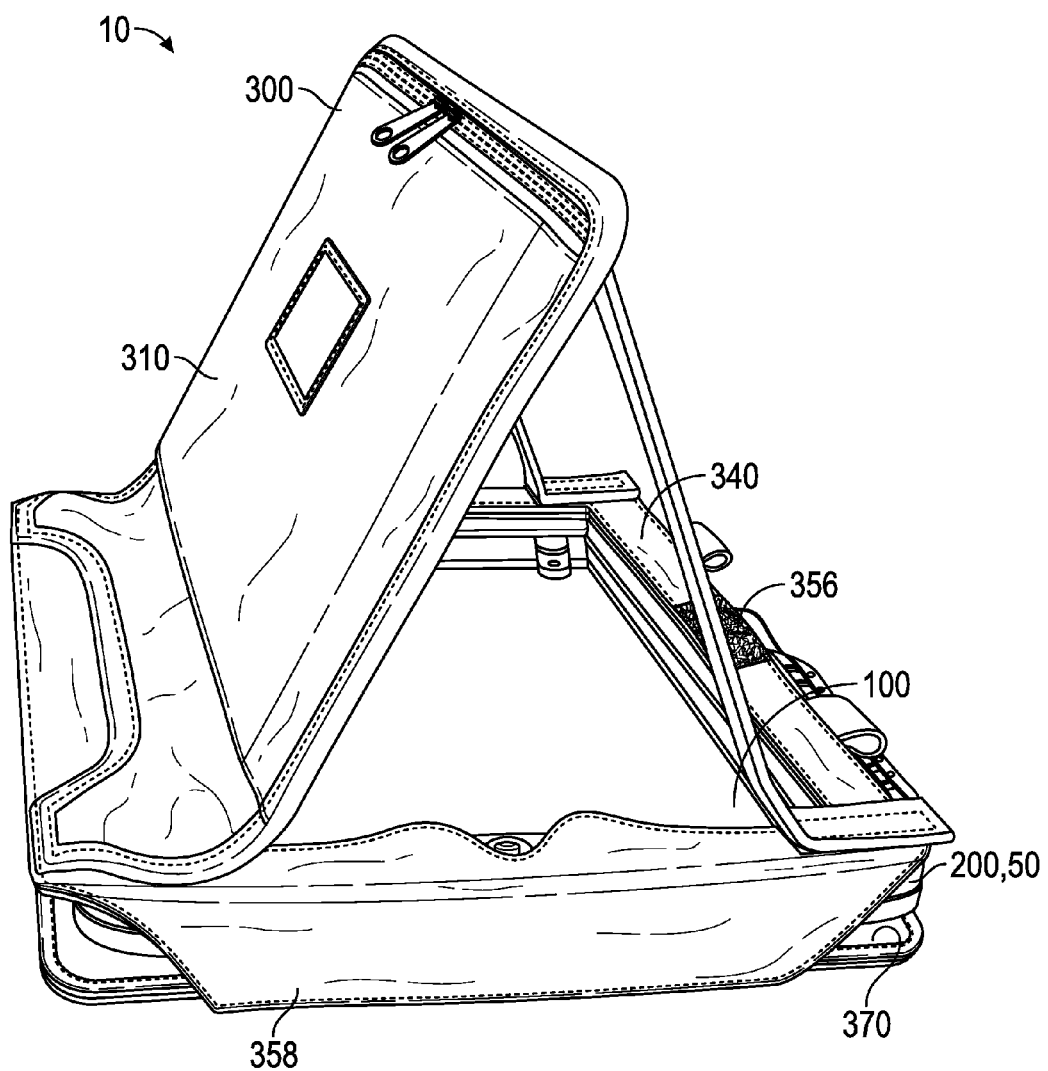
Figure 15:
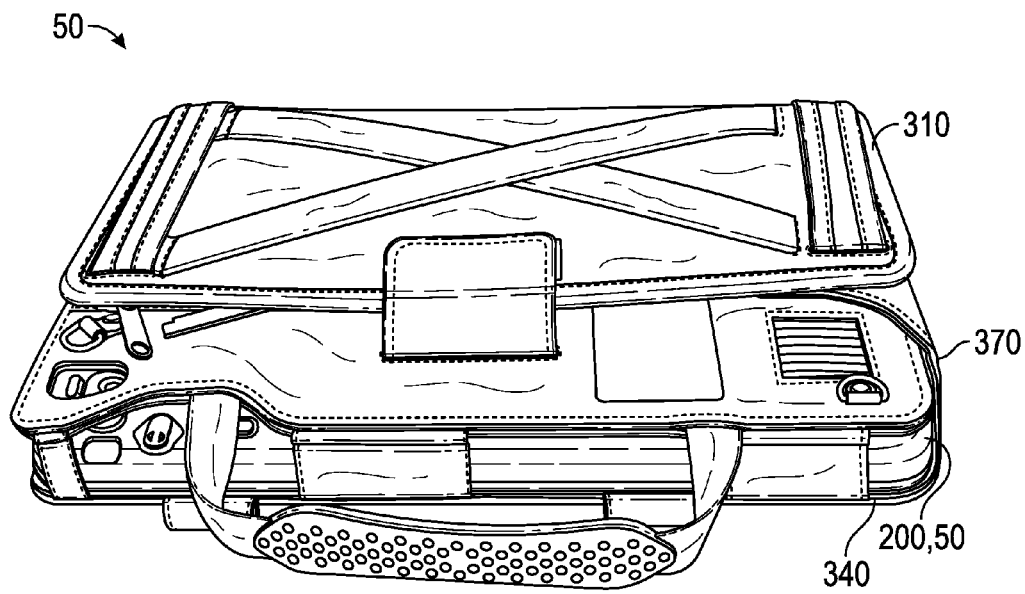
Figure 16:
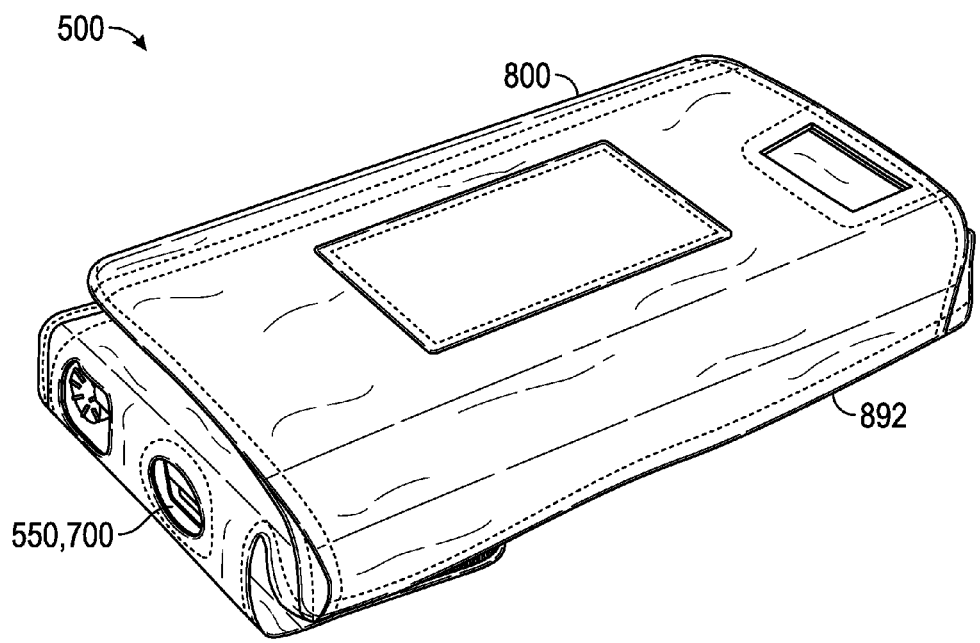
FIG. 16 is a perspective view of another embodiment of an explosion proof assembly in accordance with principles disclosed herein.

In this embodiment, outer case 300 is at least partially formed from a nylon material and generally includes a first panel or flap 310, an inner panel 340 and a second or rear panel 370. A plurality of flexible straps 390 extend between the inner panel 340 and the rear panel 370, a flexible hinge strap 392 extends between flap 310 and rear panel 370, forming a pouch or pocket 400 for receiving and securing the waterproof assembly 50. Flap 310 generally includes an outer surface 312, an inner surface 314, and four edges: left and right edges 316, 318 and upper and lower edges 320, 322, respectively. Flap 310 also includes a Velcro coupler 324 disposed on inner surface 314 proximal right edge 318. Rear panel 370 generally includes an inner surface 372, an outer surface 374 and four edges: left and right edges 376, 378 and upper and lower edges 380, 382, respectively. Flexible hinge 392, extending between and attached to left edge 316 of flap 310 and the left edge 376 of rear panel 370, allows for the relative rotation between flap 310 and rear panel 370 relative to a longitudinal or central axis of hinge 392. As shown in FIG. 14, the rotation of flap 310 relative rear panel 370 exposes the touch screen 102 of tablet 100.

Figure 10:
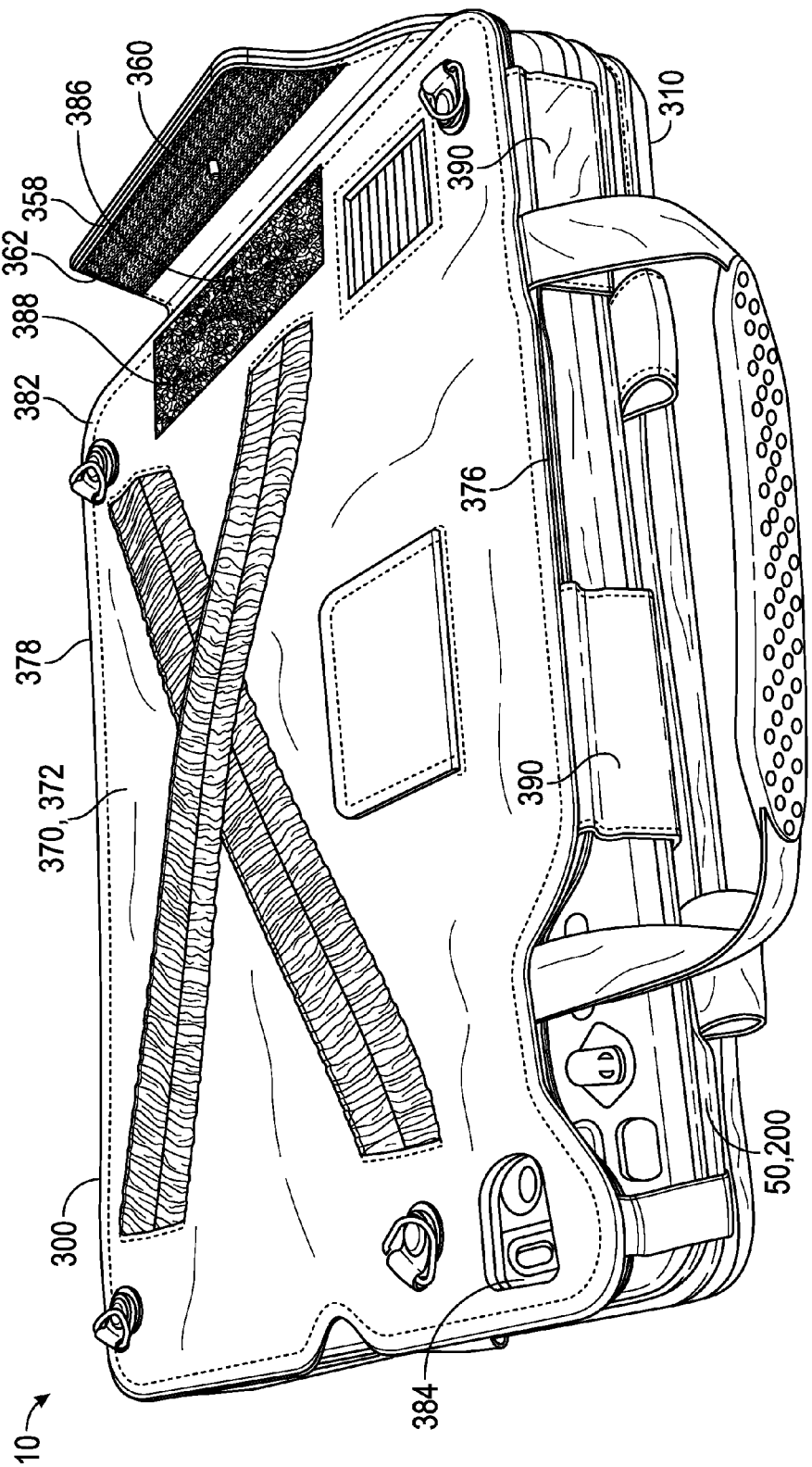
Figure 11:
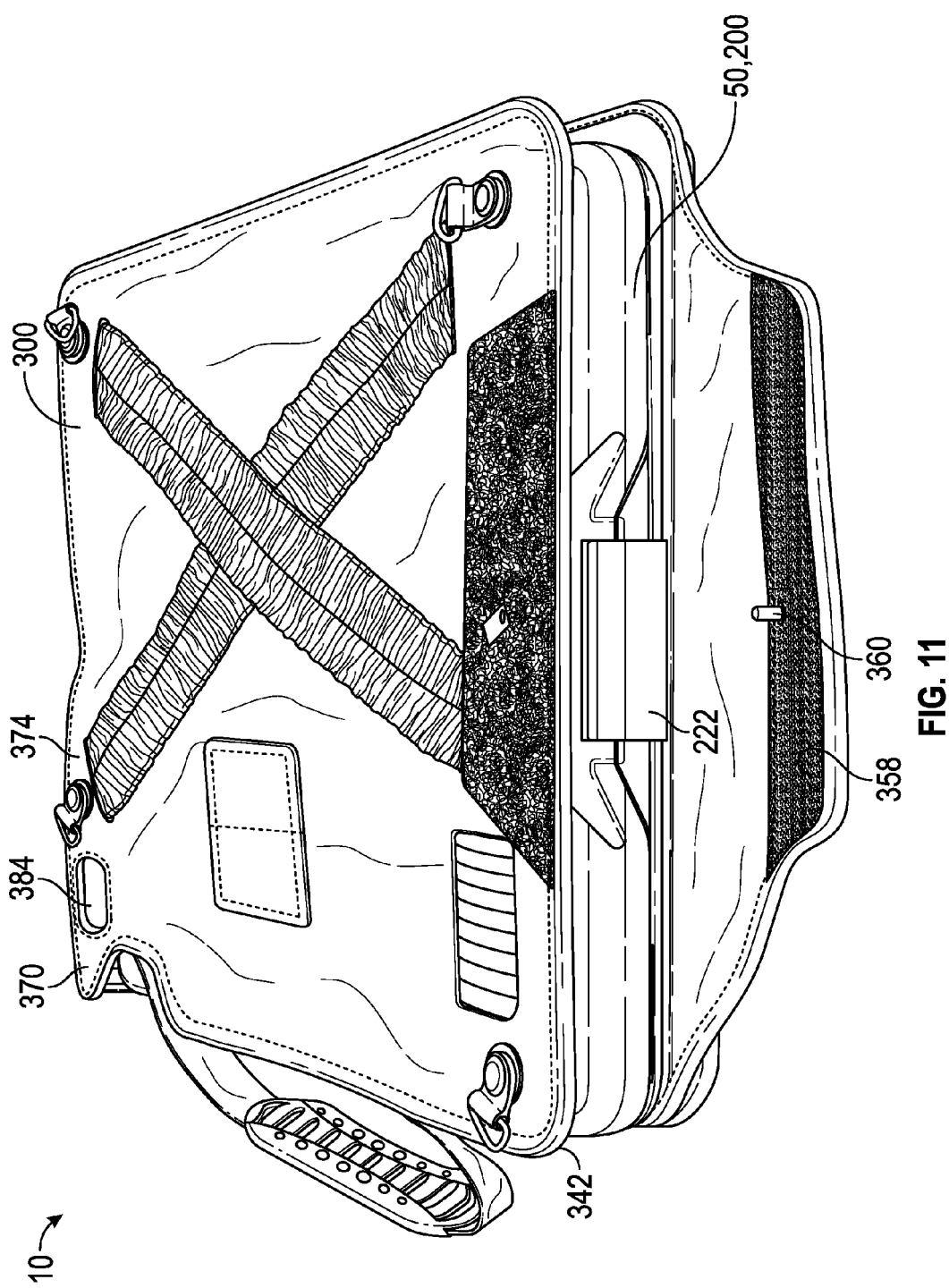
Figure 12:
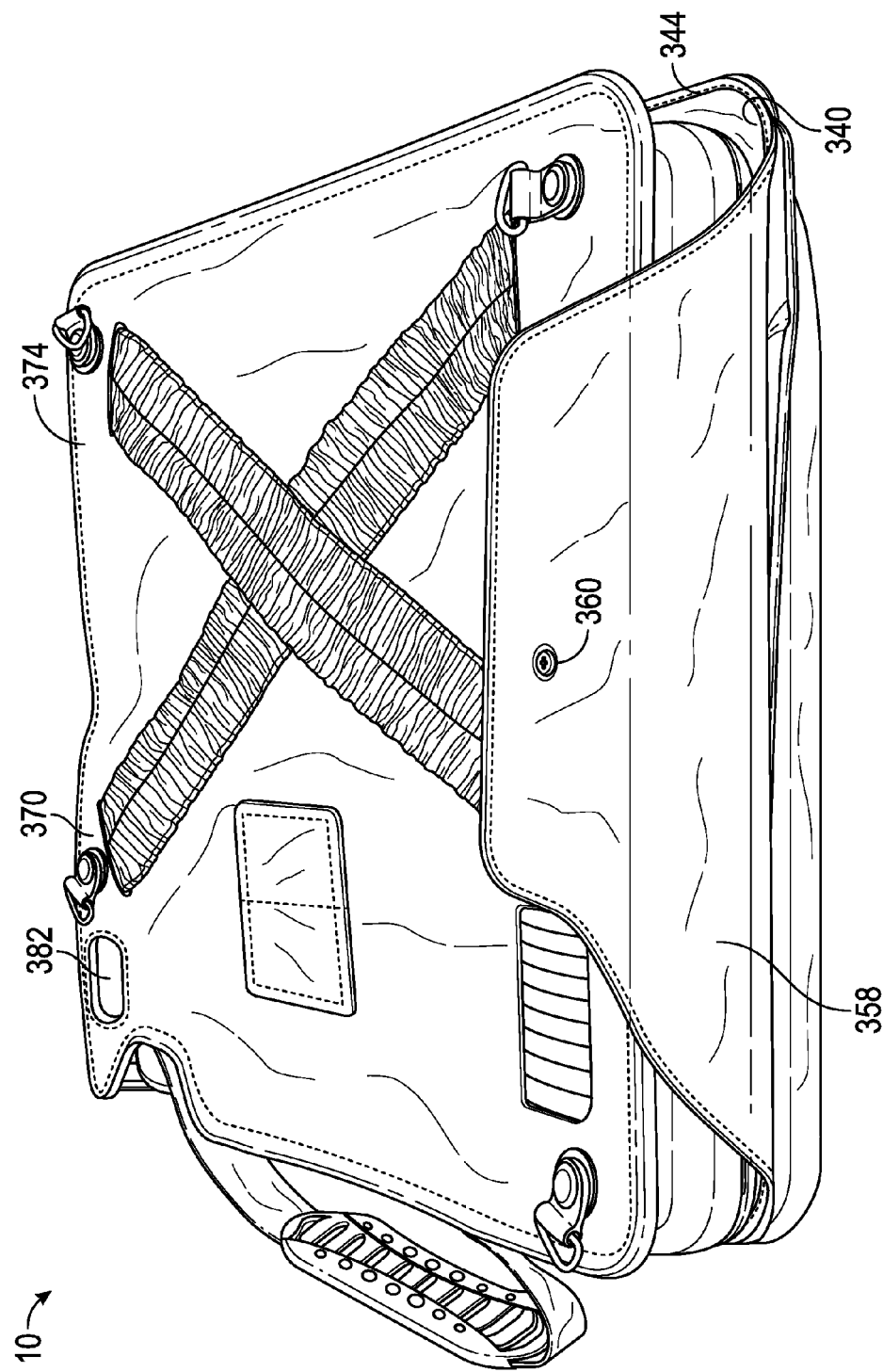
Figure 13:
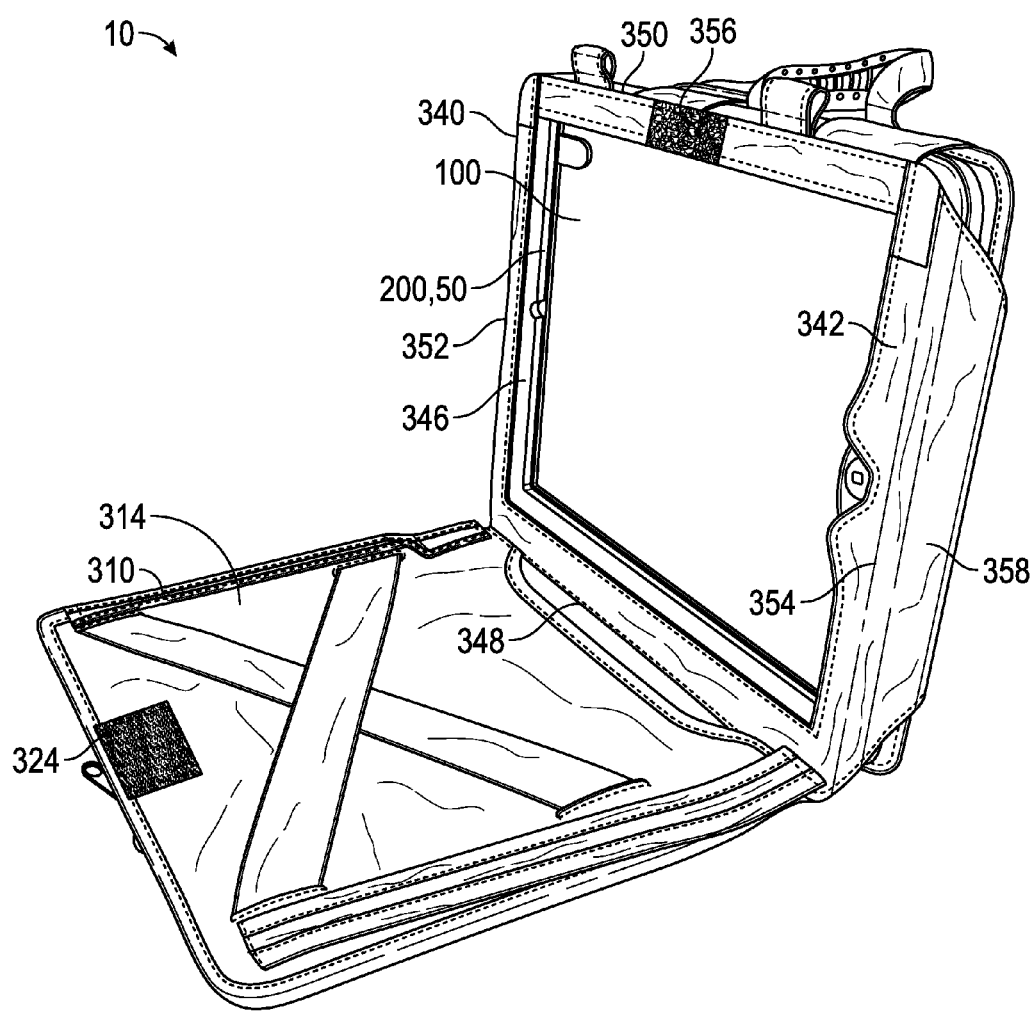

Rear panel 370 also includes a first or upper aperture 384 disposed proximal left and upper edges 376, 380, respectively. As shown in FIG. 10, when waterproof assembly 50 is disposed in pocket 400, upper aperture 384 aligned camera lens 106 of tablet 100, thus allowing for the operation of the camera of tablet 100 when explosion proof assembly 10 is assembled. A second or lower aperture 386 of rear panel 370 is disposed proximal lower edge 382 and generally equidistantly between left and right edges 376, 378, respectively. In this embodiment, a Velcro coupler 388 is disposed about lower aperture 386 proximal lower edge 382.

Inner panel 340 is disposed between the flap 310 and rear panel 380 and is configured to help secure waterproof assembly 50 in outer case 300. Inner panel 340 generally includes an outer surface 342, an inner surface 344, an opening 346 extending between surfaces 342 and 344, and four edges: left and right edges 348, 350 and upper and lower edges 352, 354, respectively. A Velcro coupler 356 is disposed on the outer surface 342 proximal right edge 350 in general alignment with the corresponding Velcro coupler 324 of flap 310. Thus, when flap 310 is in a closed position relative rear panel 370, Velcro couplers 324 and 356 may engage and help secure outer case 300 in the closed position.

While the embodiment of the outer case illustrated in FIGS. 4-15 include Velcro couplers, in other embodiments other couplers or connectors may be used or the outer case may not include a coupler between the flap and inner panel at all.

In this embodiment, inner panel 340 of case 300 also includes a lower flap 358 extending from lower edge 354 and includes a mechanical retention mechanism or screw 360 disposed proximal a lower terminal end of lower flap 358. A Velcro coupler 362 is also included on the inner surface 344 of inner panel, disposed proximal screw 360. Lower flap 358 includes an open and a closed position. In the open position, lower flap 358 provides access for tablet 100 or waterproof assembly 50 to be inserted into or removed from pocket 400 of outer case 300. In the closed position, lower flap 358 helps retain waterproof assembly 50 in case 300. Specifically, once waterproof assembly 50 has been inserted into outer case 300, flap 358 may be closed and secured in the closed position via engagement between the Velcro coupler 362 of flap 358 and Velcro coupler 388 of rear panel 370, which are in alignment when flap 358 is in the closed position. Also, when flap 358 is in the closed position, the charging port 222 of enclosure 200 is restricted from opening, and thus, restricted from exposing input connector 110 of tablet 100 to the surrounding environment, which may include hazardous material.

Further, when flap 358 is in the closed position the screw 360 of flap 358 is relatively aligned with lower aperture 386 of rear panel 370. A tool (e.g., screwdriver, hex wrench, etc.) may be used to insert and couple the screw 360 with aperture 386. Thus, once screw 360 is secured within aperture 386, flap 358 may not be opened without the use of a tool (e.g., screwdriver, hex wrench, etc.) to unfasten the screw 360 from aperture 386 and flap 358 from rear panel 370. Because the use of a tool is necessary for opening lower flap 358 once screw 360 has been fastened to aperture 386 of panel 370, the charging port 222 is prevented from opening, and thus exposing connector 110 to the surrounding environment, unless screw 360 has been unfastened from aperture 386 using the tool. For instance ANSI/ISA-12.12.01 requires that, in order for an enclosure to become certified for use in Class I and II, Division 2 and Class III, Divisions 1 and 2 Hazardous locations, any electrical components (e.g., connector 110 of tablet 100) must be isolated from the surrounding environment by an enclosure (e.g., flap 358 of case 300) that is mechanically secured in place (e.g., via screw 360 of case 300). However, in other embodiments explosion proof assembly 10 may satisfy the requirements of other standards relating to hazardous environments. Therefore, charging port 222 may not accidentally open during operation due to the secureness of the screw 360 and aperture 386 connection, and thus, case 300 and explosion proof assembly 10 are configured to prevent combustion within an internal cavity of the waterproof enclosure 200.

Referring now to FIGS. 17-20, another embodiment of an explosion proof assembly is shown. In this embodiment, an explosion proof assembly 500 that generally includes a waterproof assembly 550 disposed within an outer case 800, where the waterproof assembly 550 generally includes a computing device or smartphone 600 and a waterproof enclosure 700. In this embodiment, smartphone 600 is an iPhone® 4 produced by Apple, Inc. However, in other embodiments smartphone 600 may comprise other varying types and styles of smartphones, including but not limited to those offered by Apple and other manufacturers such as Nokia, Samsung, etc.

Figure 17B:
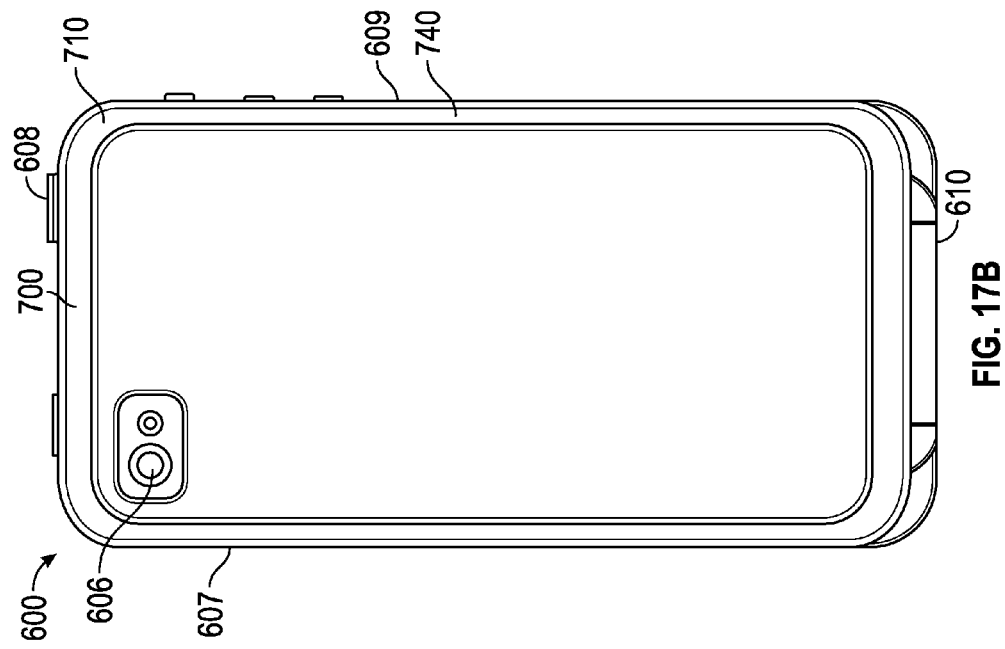
FIG. 17B is a rear view of a waterproof smart phone assembly in accordance with principles disclosed herein.
Figure 17A:
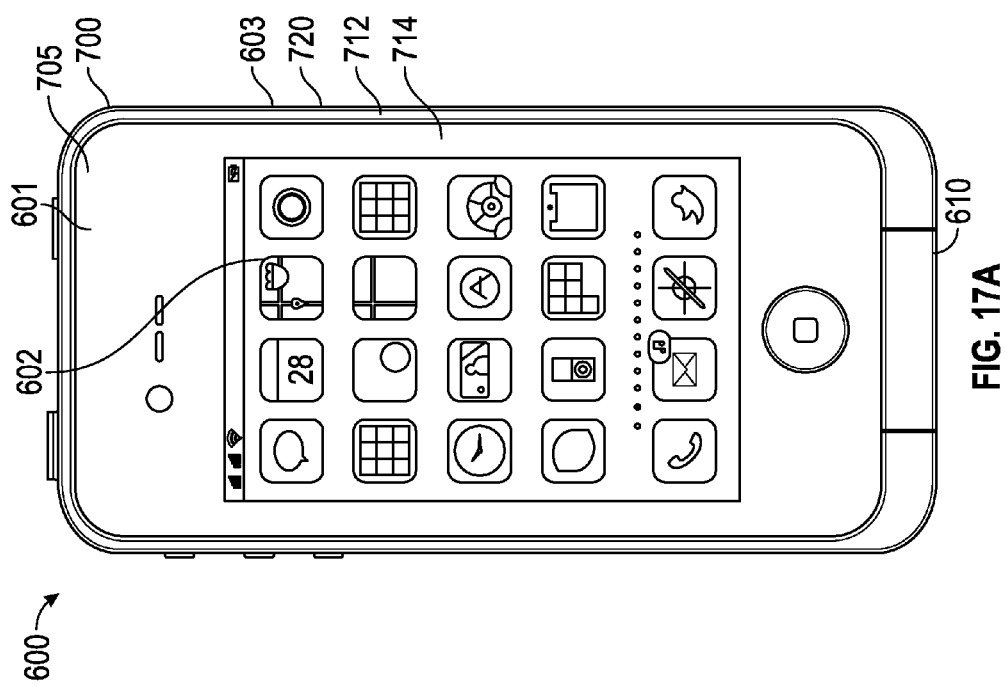
FIG. 17A is a front view of a waterproof smart phone assembly in accordance with principles disclosed herein.
Figure 18:
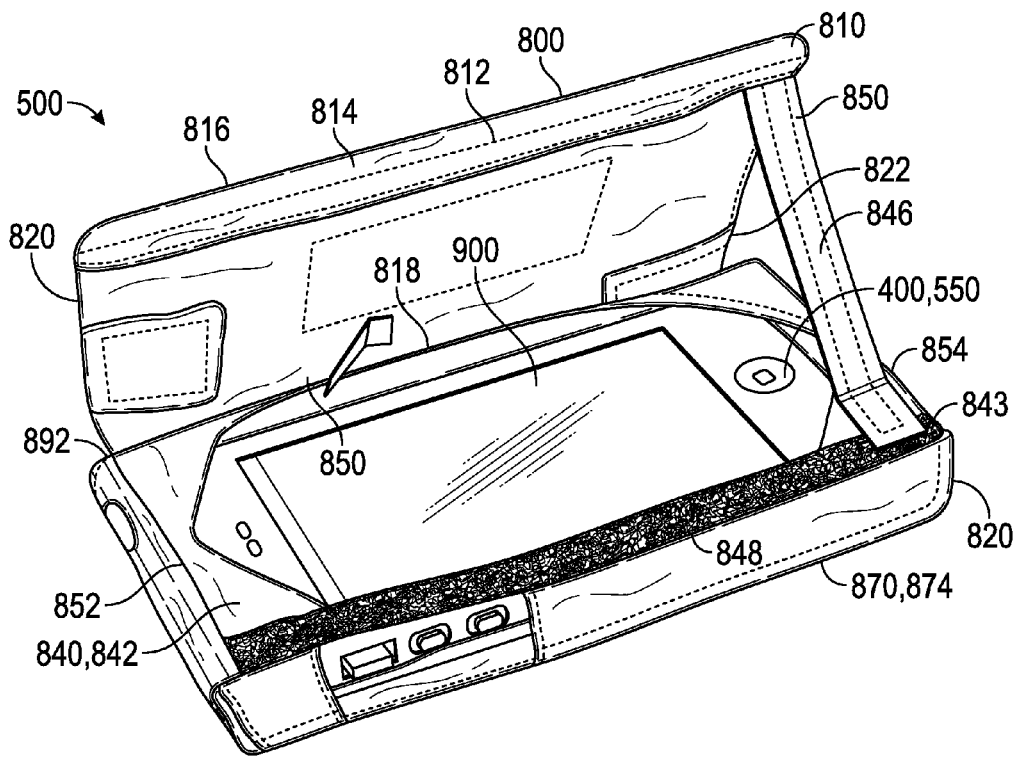
FIGS. 18-20 are perspective views of the explosion proof assembly of FIG. 16.
Figure 19:
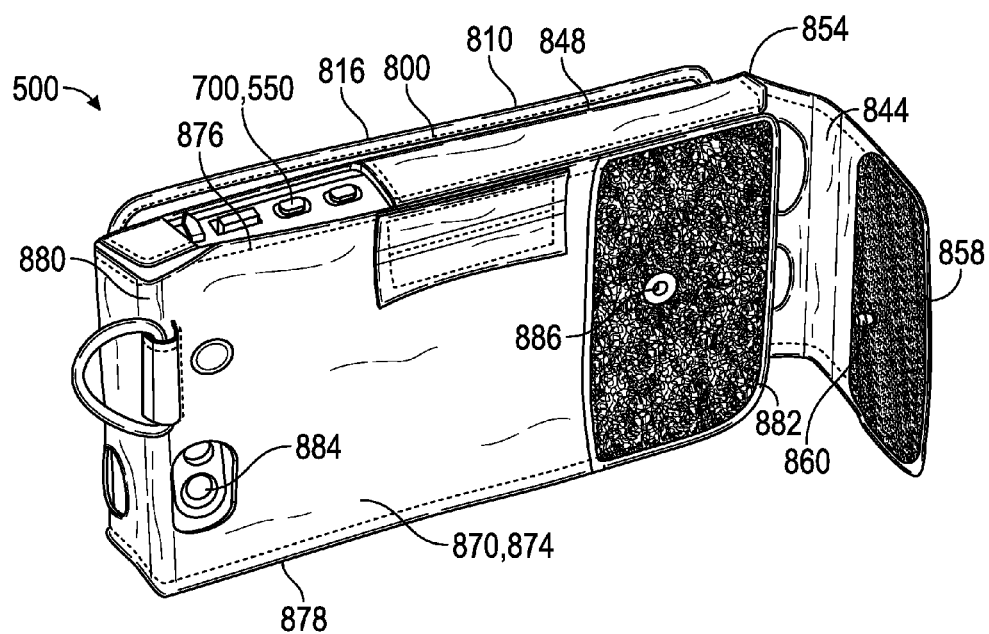
Figure 20:
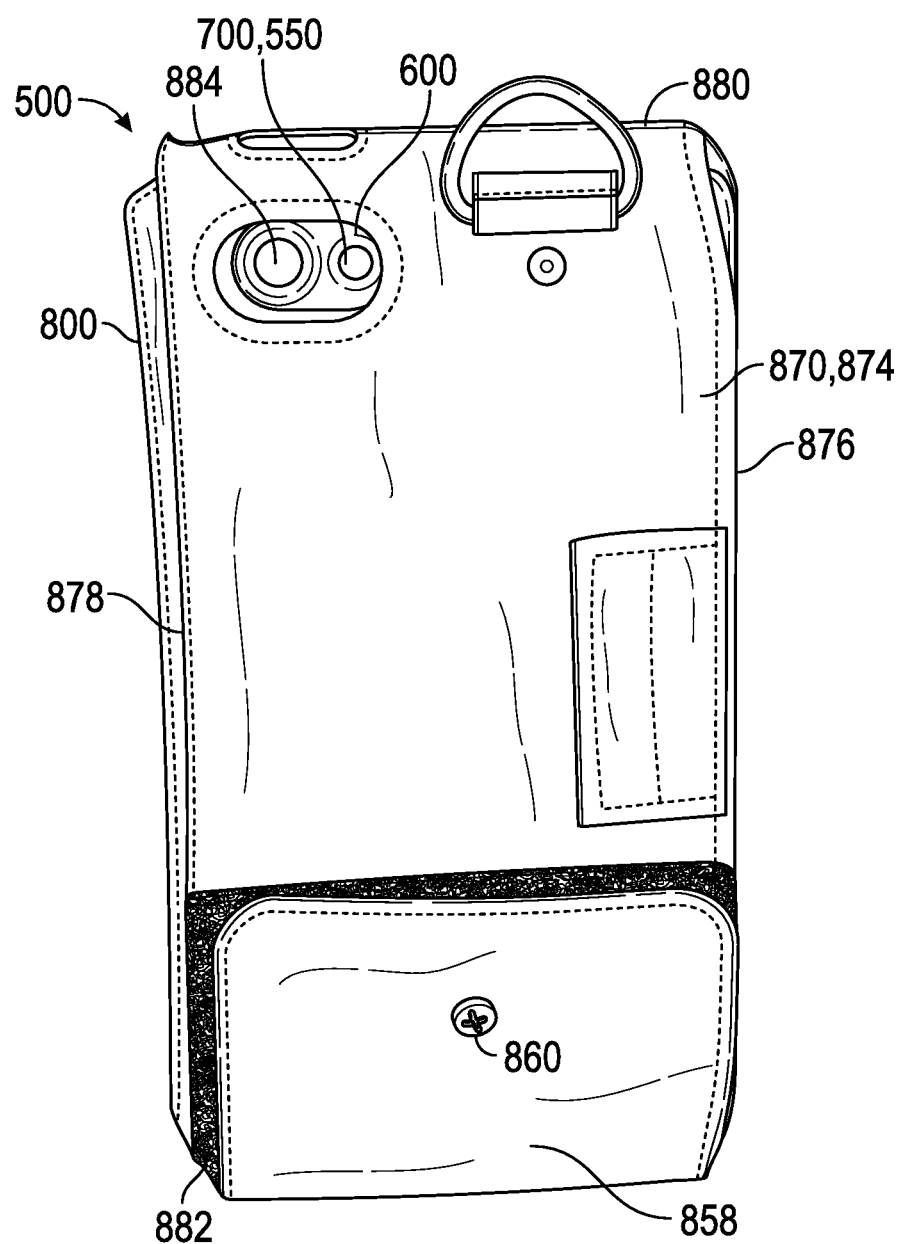

Referring to FIGS. 17A and 17B, in this embodiment smartphone 600 of waterproof assembly 550 is an iPad® 4 produced by Apple, Inc. However, in other embodiments smartphone 600 may comprise other varying types and styles of smartphones, including but not limited to those from Apple and other manufacturers. Similar to tablet 100, smartphone 600 has a flat front face 601 defined by a front outer edge 603, which includes a touch screen 602. Smartphone 600 also includes a flat rear face 605 that is defined by a rear outer edge 607. Extending between front outer edge 603 and rear outer edge 607 is a surface 609. Smartphone 600 also includes a first button 604 (home button) disposed on front face 601, a camera lens 606 disposed on rear face 605 and a second button 608 (on/off button) disposed on surface 609. An input connector 610 is disposed on surface 609. Input connector 610 is configured to allow for data and/or electrical power transfer between smartphone 600 and an external electrical device.

Similar to enclosure 200, enclosure 700 of waterproof assembly 550 (shown in an assembled configuration) is configured to prevent or at least substantially restrict fluids or particles (e.g., dust, particulates, fibers, etc.) from entering or exiting assembly 550. In this embodiment, enclosure 700 generally includes a body 710 formed from a flexible material (e.g., a firm rubber, polycarbonate or polyurethane material) having a front face 712 including a front central opening 714 extending therethrough, an outer edge 720, a second or rear face 740 including a rear central opening 742 extending therethrough and an inner cavity 705 for housing the smartphone 600. In this embodiment, enclosure 700 satisfies the IP-68 ingress protection rating standard with respect to dust and water. However, in other embodiments enclosure 700 may be formed from other materials and may be configured to satisfy other ingress protection ratings.

The outer case 800 is configured provide additional protection to smartphone 600 of waterproof assembly 550, such that, when assembly 550 is installed in case 800 to form explosion proof assembly 500, combustion resulting from the exposure of smartphone 600 is prevented or at least minimized. For instance, in this embodiment explosion proof assembly 500 is configured to satisfy the certification requirements of Class I, Division II, Class II, Division 2, class III, Divisions 1 and 2, and ATEX Zone 2 hazardous area classifications. However, in other embodiments an explosion proof assembly 500 may satisfy the safety requirements for hazardous area classifications. For instance, in other embodiments explosion proof assembly 500 may satisfy the IECEx certification and other requirements. Further, explosion proof assembly 500 is configured to allow for the safe operation of smartphone 600 in the aforementioned hazardous area classifications while still satisfying the certification requirements for those areas.

Similar to outer case 300, outer case 800 is at least partially formed from a nylon material and generally includes a first panel or flap 810, an inner panel 840 and a second or rear panel 870. A plurality of flexible straps 890 extend between the inner panel 840 and the rear panel 870, a flexible hinge strap 892 extends between flap 810 and rear panel 870, forming a pouch or pocket 900 for receiving and securing the waterproof assembly 550. Flap 810 generally includes an outer surface 812, an inner surface 814, and four edges: left and right edges 816, 818 and upper and lower edges 820, 822, respectively. Rear panel 870 generally includes an inner surface 872, an outer surface 874 and four edges: left and right edges 876, 878 and upper and lower edges 880, 882, respectively. Rear panel 870 also includes a first or upper aperture 884 disposed proximal left and upper edges 876, 880, respectively. A second or lower aperture 886 of rear panel 870 is disposed proximal lower edge 882 and generally equidistantly between left and right edges 876, 878, respectively.

Inner panel 840 is disposed between the flap 820 and rear panel 860 and is configured to help secure waterproof assembly 550 in outer case 800. Inner and 840 generally includes an outer surface 842, an inner surface 844, an opening 846 extending between surfaces 842 and 844, and four edges: left and right edges 848, 850 and upper and lower edges 852, 854, respectively. In this embodiment, inner panel 840 of case 800 also includes a lower flap 858 extending from lower edge 854 and includes a screw 860 disposed proximal a lower terminal end of lower flap 858. Lower flap 858 includes an open position and a closed position. In the open position, lower flap 858 provides access for smartphone 600 or waterproof assembly 550 to be inserted into or removed from pocket 900 of outer case 800. In the closed position, lower flap 858 helps retain waterproof assembly 550 in case 800. Also, when flap 858 is in the closed position, the charging port 722 of enclosure 700 is restricted from opening, and thus, restricted from exposing input connector 610 of smartphone 600 to the surrounding environment, which may include hazardous material.

Further, when flap 858 is in the closed position the screw 860 of flap 858 is relatively aligned with lower aperture 886 of rear panel 870. A tool (e.g., screwdriver, hex wrench, etc.) may be used to insert and couple the screw 860 with aperture 886. Thus, once screw 860 is secured within aperture 886, flap 858 may not be opened without the use of a tool (e.g., screwdriver, hex wrench, etc.) to unfasten the screw 860 from aperture 886 and flap 858 from rear panel 870.

Figure 21:
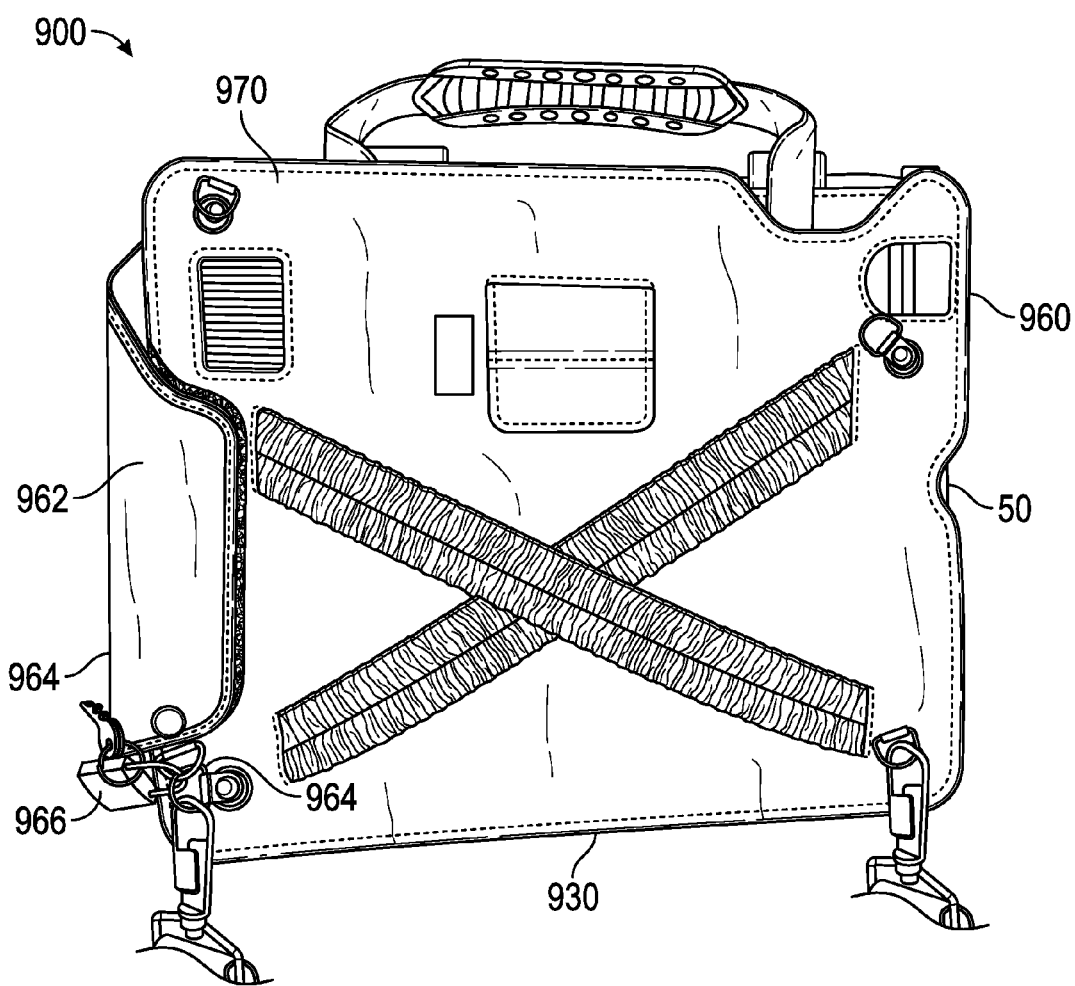
FIG. 21 is a rear view of another embodiment of an explosion proof assembly in accordance with principles disclosed herein.

Referring to FIG. 21, another embodiment of an explosion proof assembly 950 is shown. Assembly 950 is similar to explosion proof assembly 10, and thus, similar features are numbered alike. In this embodiment, explosion proof assembly 950 generally includes an outer case 960 and waterproof assembly 50. Case 960 is similar to outer case 300, except a lower flap 962 (similar to lower flap 358 of case 300) does not include a retention mechanism including a screw that may be fastened with the use of a tool. Instead, flap 962 and rear panel 970 (similar to rear panel 370 of case 300) each include a retention ring 964, with one ring 964 secured to flap 962 and the other secured to rear panel 970, where rings 964 are disclosed proximal one another when flap 962 is in a closed position. In this embodiment, flap 962 may be secured or retained in a close position by locking together rings 962 using a lock 966, thus preventing flap 962 from opening accidentally.

The above discussion is meant to be illustrative of the principles and various embodiments of the present disclosure. While certain embodiments have been shown and described, modifications thereof can be made by one skilled in the art without departing from the spirit and teachings of the disclosure. The embodiments described herein are exemplary only, and are not limiting. Accordingly, the scope of protection is not limited by the description set out above, but is only limited by the claims which follow, that scope including all equivalents of the subject matter of the claims.

What is claimed is:

1. An explosion proof assembly comprising:
   an outer case formed at least partially from a nylon material, and further comprising an aperture;
   a waterproof assembly comprising: a computing device comprising an input connector, the computing device being operably configured for taking photos via a camera lens, and being operable via a touchscreen; and a waterproof enclosure sealingly engaged therearound the computing device while leaving touch access to the touchscreen, the waterproof enclosure having a body formed from a flexible material, the body further comprising: a front face, a rear face, and a charging port therebetween,
   wherein the charging port is configured to move between a closed position and an open position, wherein when the charging port is in the closed position the ingress or egress of water or dust thereby is restricted, wherein when the charging port is in the open position access to the input connector is provided, wherein the rear face comprises a lens disposed over the camera lens, and wherein the waterproof assembly is disposed within the outer case in a manner whereby the camera lens, the lens, and the aperture are aligned.

2. The explosion proof assembly of claim 1, wherein the input connector is an electrical connector, and wherein the outer case is configured to prevent any sparks, electrical energy, or thermal energy from within the waterproof enclosure from escaping therefrom and into a surrounding environment while also allowing a user to interface with the touch screen.

3. The explosion proof assembly of claim 2, wherein the computing device comprises one of a tablet computer and a smartphone.

4. The explosion proof assembly of claim 3, wherein the outer case comprises a flap having a tool-operated retention mechanism configured to secure the flap in a closed case position.

5. The explosion proof assembly of claim 4, wherein when the flap is in the closed case position the input connector of the computing device is prevented from being exposed to an external environment of the explosion proof assembly.

6. The explosion proof assembly of claim 5, wherein the retention mechanism comprises a screw that is configured to mechanically couple to a rear panel of the outer case.

7. An explosion proof assembly comprising:
   an outer case, and further comprising an aperture;
   a waterproof assembly comprising: a computing device comprising an input connector, the computing device being operably configured for taking photos via a camera lens, and being operable via a touchscreen; and a waterproof enclosure sealingly engaged therearound the computing device while leaving touch access to the touchscreen, the waterproof enclosure having a body further comprising: a front face, a rear face, and a charging port therebetween,
   wherein the charging port is configured to move between a closed position and an open position, wherein when the charging port is in the closed position the ingress or egress of water or dust is restricted, wherein when the charging port is in the open position access to the input connector is provided, wherein the outer case comprises a flap having a tool-operated retention mechanism configured to secure the flap in a closed case position, and wherein when the flap is in the closed case position the explosion proof assembly is configured to prevent combustion products from escaping therefrom and into an external environment of the explosion proof assembly.

8. The explosion proof assembly of claim 7, wherein the outer case is further configured to allow a user to actuate the touch screen.

9. The explosion proof assembly of claim 8, wherein the rear face comprises a lens positioned proximate to the camera lens, and wherein the waterproof assembly is disposed within the outer case in a manner whereby the camera lens, the lens, and the aperture are aligned.

10. The explosion proof assembly of claim 9, wherein the computing device comprises one of a tablet computer and a smartphone.

11. The explosion proof assembly of claim 10, wherein the outer case is formed at least partially from a nylon material, the body is formed from a flexible material, and wherein the retention mechanism comprises a screw that is configured to mechanically couple to a rear panel of the outer case.

12. The explosion proof assembly of claim 7, the assembly further comprising:
a first ring secured to the flap;
a second ring secured to a rear panel of the outer case; and
a lock secured to the first ring and the second ring.

13. An explosion proof assembly comprising:
an outer case formed at least partially from a nylon material, and further comprising an aperture;
a waterproof assembly comprising: a tablet computer comprising an input connector, the computing device being operably configured for taking photos via a camera lens, and being operable via a touchscreen; and
a waterproof enclosure sealingly engaged therearound the computing device while leaving touch access to the touchscreen, the waterproof enclosure having a body formed from a flexible material, the body further comprising: a front face, a rear face, and a charging port, wherein the charging port is configured to move between a closed position and an open position, wherein when the charging port is in the closed position the ingress or egress of water or dust is restricted, wherein the rear face comprises a lens aligned and disposed over the camera lens, wherein the waterproof assembly is disposed within the outer case in a manner whereby the camera lens, the lens, and the aperture are aligned, wherein the outer case comprises a flap having a retention mechanism configured to secure the flap in a closed case position, and wherein when the flap is in the closed case position the input connector of the computing device is prevented from being exposed to an external environment of the explosion proof assembly.

14. The explosion proof assembly of claim 13, wherein the outer case is configured to prevent electrical or thermal energy from escaping into the external environment while at the same time allowing a user to actuate the touch screen.

15. The explosion proof assembly of claim 14, wherein the retention mechanism comprises a screw that is configured to mechanically couple to a rear panel of the outer case.

16. The explosion proof assembly of claim 14, wherein the retention mechanism comprises:
a first ring secured to the flap of the case;
a second ring secured to a rear panel of the case; and
a lock secured to the first ring and the second ring,
wherein the lock secures the flap in a closed position.

* * * * *